United States Patent
Ino et al.

(10) Patent No.: US 11,991,437 B2
(45) Date of Patent: May 21, 2024

(54) ROBOT, CONTROL PROCESSING METHOD, AND NON-TRANSITORY COMPUTER READABLE RECORDING MEDIUM STORING CONTROL PROCESSING PROGRAM

(71) Applicant: Panasonic Intellectual Property Corporation of America, Torrance, CA (US)

(72) Inventors: Tomoaki Ino, Kanagawa (JP); Hwayoung Kang, Kyoto (JP); Tetsuji Fuchikami, Osaka (JP); Motoji Ohmori, Osaka (JP); Takashi Kondo, Gifu (JP); Takanori Endo, Gifu (JP); Yuki Ishihara, Gifu (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 243 days.

(21) Appl. No.: 17/677,747

(22) Filed: Feb. 22, 2022

(65) Prior Publication Data

US 2022/0182533 A1 Jun. 9, 2022

Related U.S. Application Data

(63) Continuation of application No. PCT/JP2020/031335, filed on Aug. 19, 2020.
(Continued)

(30) Foreign Application Priority Data

Dec. 23, 2019 (JP) .................................. 2019-231304

(51) Int. Cl.
*H04N 23/611* (2023.01)
*A63H 5/00* (2006.01)
(Continued)

(52) U.S. Cl.
CPC ............. *H04N 23/611* (2023.01); *A63H 5/00* (2013.01); *A63H 11/00* (2013.01); *A63H 30/02* (2013.01); *A63H 33/22* (2013.01); *G06F 3/165* (2013.01)

(58) Field of Classification Search
CPC ........ A63H 11/00; A63H 30/02; A63H 33/22; A63H 5/00; G03B 17/02; G03B 2206/00;
(Continued)

(56) References Cited

U.S. PATENT DOCUMENTS 9,724,824 B1 * 8/2017 Annan .................. B25J 9/1615
2016/0337582 A1 * 11/2016 Shimauchi ........... H04N 23/661
(Continued)

FOREIGN PATENT DOCUMENTS

JP 2002-185837 6/2002

OTHER PUBLICATIONS

International Search Report (ISR) from International Searching Authority (Japan Patent Office) in International Pat. Appl. No. PCT/JP2020/031335, dated Nov. 17, 2020, together with an English language translation.

*Primary Examiner* — Amy R Hsu
(74) *Attorney, Agent, or Firm* — Greenblum & Bernstein, P.L.C.

(57) ABSTRACT

A first camera robot includes: a camera that captures an image of surroundings; an image recognizer that detects one or more subjects from within a captured image; a controller that selects an operation pattern of the first camera robot based on an attribute of one or more subjects detected, and causes the robot to operate according to the selected operation pattern; a communicator that transmits, to another camera robot, instruction information for causing the other robot to operate according to the selected operation pattern; and a shutter that outputs an image obtained by capturing the
(Continued)

one or more subjects while the first camera robot and the other robot are operating according to the selected operation pattern.

9 Claims, 19 Drawing Sheets

Related U.S. Application Data

(60) Provisional application No. 62/915,858, filed on Oct. 16, 2019.

(51) Int. Cl.
*A63H 11/00* (2006.01)
*A63H 30/02* (2006.01)
*A63H 33/22* (2006.01)
*G06F 3/16* (2006.01)

(58) Field of Classification Search
CPC ...... G06F 3/165; G06V 20/10; G06V 40/103; G06V 40/178; H04N 23/611; H04N 5/222
See application file for complete search history.

(56) References Cited

U.S. PATENT DOCUMENTS

| | | | |
|---|---|---|---|
| 2017/0352351 A1* | 12/2017 | Kimura | B25J 13/089 |
| 2017/0366745 A1* | 12/2017 | Cheng | H04N 23/64 |
| 2018/0124525 A1* | 5/2018 | Mueller-Wehlau | G06F 16/683 |
| 2018/0353869 A1* | 12/2018 | Corkin | A63H 5/00 |
| 2019/0262998 A1* | 8/2019 | Sasagawa | G10L 15/26 |
| 2020/0014861 A1* | 1/2020 | Zhang | H04N 23/53 |

* cited by examiner

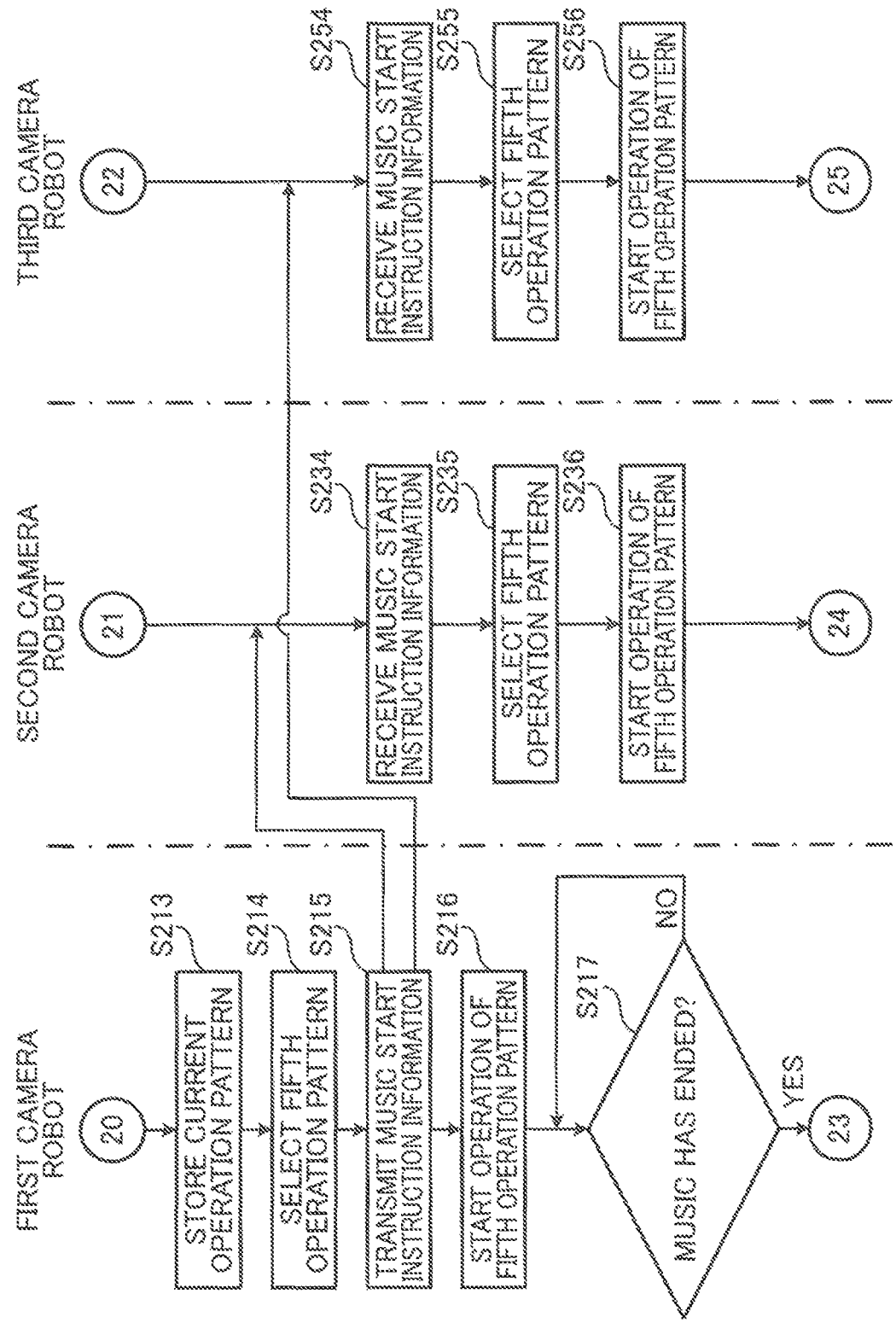

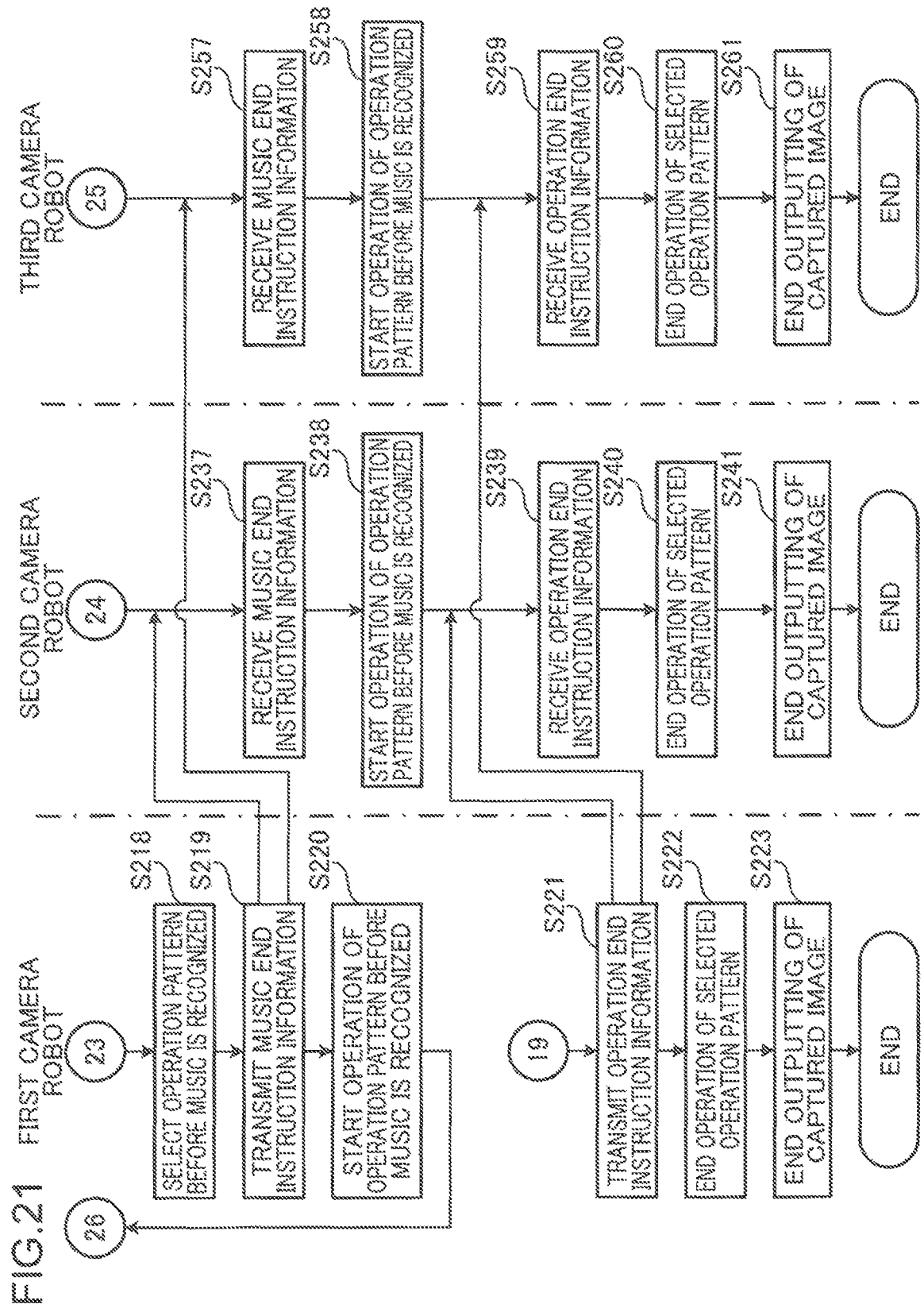

ROBOT, CONTROL PROCESSING METHOD, AND NON-TRANSITORY COMPUTER READABLE RECORDING MEDIUM STORING CONTROL PROCESSING PROGRAM

TECHNICAL FIELD

The present disclosure relates to a technique for capturing an image of one or more subjects through operation together with another robot.

BACKGROUND ART

In recent years, various robots have been introduced into the market. In addition, a technique has also been developed in which a plurality of robots each having a camera perform cooperative operation.

For example, Patent Literature 1 discloses a robot camera device in which a plurality of robot cameras exchange photographing information with each other and perform cooperative operation to automatically perform photographing according to a situation, and a person operates the robot camera as necessary.

However, in the above-described conventional technique, it is difficult to bring out a good facial expression from a subject, and further improvement is required.

CITATION LIST

Patent Literature

Patent Literature 1: Japanese Patent Application Laid-Open No. 2002-185837

SUMMARY OF INVENTION

The present disclosure has been made to solve the above problem, and an object of the present disclosure is to provide a technique capable of providing a space with a pleasant atmosphere to one or mote subjects and bringing out a good facial expression from the one or more subjects.

A robot according to one aspect of the present disclosure is a robot that operates together with another robot to capture an image of one or more subjects, the robot including: an imager that captures an image of surroundings; a detector that detects one or more subjects from within a captured image; a selector that selects an operation pattern of the robot based on an attribute of the one or more subjects detected; a transmitter that transmits, to the other robot, instruction information for causing the other robot to operate according to the selected operation pattern; an operator that causes the robot to operate according to the selected operation pattern; and an outputter that outputs an image obtained by capturing the one or more subjects while the robot and the other robot are operating according to the selected operation pattern.

According to the present disclosure, a space with a pleasant atmosphere can be provided to one or more subjects, and a good facial expression can be brought out from the one or more subjects.

BRIEF DESCRIPTION OF DRAWINGS

FIG. 20 is a third flowchart for explaining the operation of the imaging system according to the third embodiment of the present disclosure.

FIG. 21 is a fourth flowchart for explaining the operation of the imaging system according to the third embodiment of the present disclosure.

DESCRIPTION OF EMBODIMENTS

Knowledge Underlying the Present Disclosure

Figure 1:
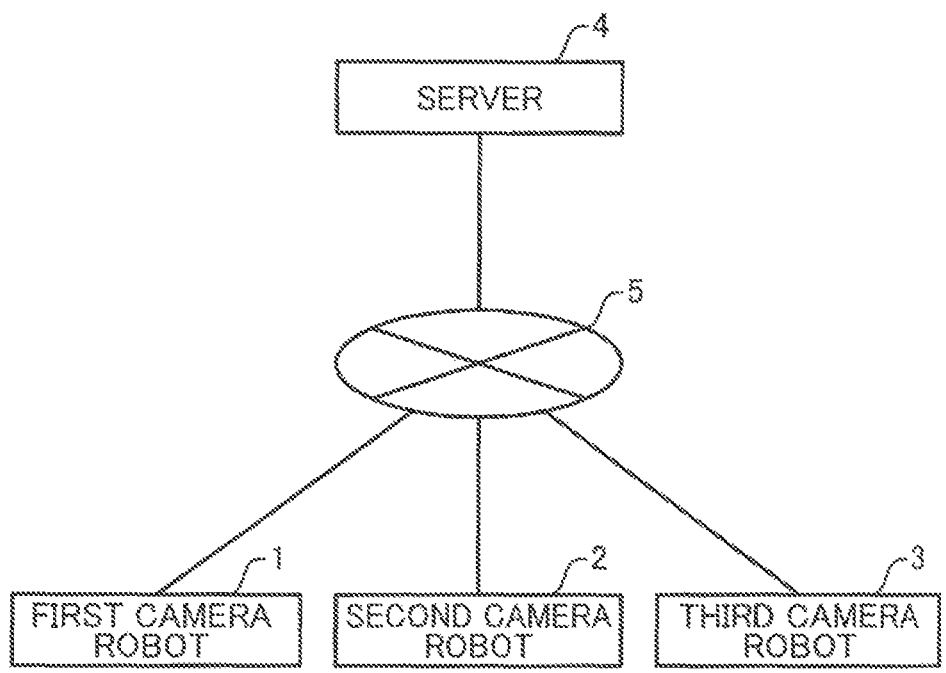
FIG. 1 is a diagram illustrating an overall configuration of an imaging system according to a first embodiment of the present disclosure.

The above-described robot camera device in the related art includes one or more robot cameras each having a photographing camera and a robot camera driver; a position detector that measures a three-dimensional position of a subject within a photographing range; a state detector that measures information for state detection including voice information of the subject; and a scenario server that comprehensively manages various photographing control information including a photographing method related to a program-specific shot the one or more robot cameras, the position detector, the state detector, and the scenario server are unitized and distributedly arranged, and the units are configured to be capable of communicating with each other via a communication network.

The one or more robot cameras described above merely automatically photograph a subject. Therefore, the operation of one or more robot cameras will not cause a facial expression of a subject to change, so that it is difficult to bring out a good facial expression from the subject.

In order to solve the above problem, a robot according to one aspect of the present disclosure is a robot that operates together with another robot to capture an image of one or more subjects, the robot including: an imager that captures an image of surroundings; a detector that detects one or more subjects from within a captured image; a selector that selects an operation pattern of the robot based on an attribute of the detected one or more subjects; a transmitter that transmits, to the other robot, instruction information for causing the oilier robot to operate according to foe selected operation pattern; an operator that causes the robot to operate according to the selected operation pattern; and an outputter that outputs an image obtained by capturing the one or more subjects while foe robot and the other robot are operating according to the selected operation pattern.

According to this configuration, an operation pattern of the robot is selected based on an attribute of one or more subjects, the robot and the other robot operate according to the selected operation pattern, and an image obtained by capturing one or more subjects is output while the robot and the other robot operate according to the selected operation pattern.

Therefore, since the plurality of robots simultaneously operate according to the selected operation pattern, a space with a pleasant atmosphere can be provided to one or more subjects, and a good facial expression can be brought out from one or more subjects.

The above robot may further include a subject recognizer that recognizes whether the detected one or more subjects are children or adults, in which the selector may select a first operation pattern in a case where the detected one or more subjects are children only, and select a second operation pattern having a smaller operation amount of the robot than the first operation patient in a case where the detected one or more subjects are not children only.

According to this configuration, a plurality of robots operate in different operation patterns in the case where the one or more subjects are children only and in the case where the one or more subjects are not children only. Therefore, various facial expressions can be brought out from children without making the children feel boring.

The above robot may further include a sensor that detects the robot having been lifted, in which upon detection of the robot being lifted, the selector may select a third operation pattern of reacting to the lifting, and the transmitter may transmit lifting information indicating that the robot has been lifted to the other robot.

According to this configuration, when the robot is detected having been lifted, the third operation pattern of reacting to the lifting is selected, and the robot operates according to the third operation pattern. Therefore, for example, the robot operating in the third operation pattern expressing refusal makes it possible to urge a person who has lifted the robot to put down the robot. In addition, the one or more subjects can intentionally lift the robot to enjoy movement of the robot according to the third operation pattern that is different from the first operation pattern and the second operation pattern.

The above robot may further include a receiver that receives the lifting information from the other robot, in which when the lifting information from the other robot is received, the selector may select & fourth operation pattern of reacting to the lifting of the other robot.

According to this configuration, when lifting information from the other robot is received, the fourth operation pattern of reacting to the lifting of the other robot is selected. Therefore, for example, the robot operating in live fourth operation pattern expressing anger makes it possible to urge a person who has lifted the robot to put down the other robot.

Furthermore, in the robot described above, the sensor may detect the lifted robot having been put down, and upon detection of the robot having been put down, the selector may select an operation pattern that has been performed before she robot is lifted.

According to this configuration, when the lifted robot is put down, the robot can be operated in an operation pattern before the robot is lifted.

Furthermore, the robot described above may further include a sound collector that collects surrounding sound, a music recognizer recognizes the collected sound as music, and a speaker, in which the selector may select a fifth operation pattern of outputting sound from the speaker in accordance with a rhythm of the recognized music.

According to this configuration, in a case where the collected sound is recognized as music, the sound is output from the speaker in accordance with the rhythm of the recognized music. Therefore, a space with a pleasant atmosphere can be provided to one or more subjects, and a good facial expression can be brought out from one or more subjects.

The robot may further include a memory that stores installation location information indicating an installation location of the robot and personality information indicating a personality set in the robot in advance; and a receiver that receives the installation location information and the personality information of the other robot from the other robot, in which in a case where the installation location of the robot is same as the installation location of the other robot, the operator may change an operation amount of the selected operation pattern based on the personality of the robot and the personality of the other robot.

According to this configuration, for example, a combination of compatible personalities and a combination of incompatible personalities are set as personalities of a robot. In this case, if personalities of a plurality of robots having the same installation location are a compatible combination, an operation amount of the selected operation pattern is increased. In addition, if the personalities of the plurality of robots having the same, installation location are a combination of incompatible personalities, the operation amount of the selected operation pattern is decreased. As described above, since the operation amount of the selected operation pattern changes with the personalities set for the plurality of robots, it is possible to form a virtual relationship of the plurality of robots without making one or more subjects feel boring.

The above robot may further include a display formed in a main body of the robot, a speaker formed in the main body, and a driver that drives a part of the main body, in which the operator may cause the display to display an image indicating a predetermined facial expression according to the selected operation pattern, cause the speaker to output a predetermined sound, and cause the driver to drive a part of the main body according to a predetermined drive pattern.

According to this configuration, by storing an image indicating a facial expression, sound, and a drive pattern of a part of the main body in advance in association with the plurality of operation patterns, the display, the speaker, and the driver can be operated according to a selected operation pattern, and a space that can be enjoyed by one or more subjects can be provided.

A control processing method according to another aspect of the present disclosure is a control processing method in a robot that operates together with another robot to capture an image of one or more subjects, the control processing method including: capturing an image of surroundings; detecting one or more subjects from within a captured image; selecting an operation pattern of the robot based on an attribute of the one or more subjects detected; transmitting, to the other robot, instruction information for operating the other robot according to the selected operation pattern; causing the robot to operate according to the selected operation pattern; and outputting an image obtained by capturing the one or more subjects while the robot and the other robot are operating according to the selected operation pattern.

According to this configuration, an operation pattern of the robot is selected based on an attribute of one or more subjects, the robot and the other robot operate according to the selected operation pattern, and an image obtained by cantering one or more subjects is output while the robot and the other robot operate according to the selected operation pattern.

Therefore, since the plurality of robots simultaneously operate according to the selected operation pattern, a space with a pleasant atmosphere can be provided to one or more subjects, and a good facial expression can be brought out from one or more subjects.

A non-transitory computer readable recording medium storing a control processing program according to a still another aspect of the present disclosure is a control processing program for causing a robot to operate together with another robot to capture an image of one or more subjects, the control processing program causing a computer to function as: an imager that captures an image of surroundings; a detector that detects one or more subjects from within a captured image; a selector that selects an operation pattern of the robot based on an attribute of the detected one or more subjects; a transmitter that transmits, to the other robot, instruction information for causing the other robot to operate according to the selected operation pattern; an operator that causes the robot to operate according to the selected operation pattern; and an outputter that outputs an image obtained by capturing the one or more subjects while the robot and the other robot are operating according to the selected operation pattern.

According to this configuration, an operation pattern of the robot is selected based on an attribute of one or more subjects, the robot and the other robot operate according to the selected operation pattern, and an image obtained by capturing one or more subjects is output while the robot and the other robot operate according to the selected operation pattern.

Therefore, since the plurality of robots simultaneously operate according to the selected operation pattern, a space with a pleasant atmosphere can be provided to one or more subjects, and a good facial expression can be brought out from one or more subjects.

Hereinafter, embodiments of the present disclosure will be described with reference to the accompanying drawings. Note that the following embodiments are examples embodying the present disclosure, and do not limit the technical scope of the present disclosure.

First Embodiment

FIG. 1 is a diagram illustrating an overall configuration of an imaging system according to a first embodiment of the present disclosure.

The imaging system illustrated in FIG. 1 includes a first camera robot 1, a second camera robot 2, a third camera robot 3, and a server 4.

The first camera robot 1, the second camera robot 2, and the third camera robot 3 are arranged in the same space at home. The first camera robot 1, the second camera robot 2, and the third camera robot 3 are arranged in a living room, for example. Each of the first camera robot 1, the second camera robot 2, and the third camera robot 3 detects one or more subjects and captures an image of the detected one or more subjects. The subject is a person.

The first camera robot 1, the second camera robot 2, and the third camera robot 3 are communicably connected to each other via a network 5. One of the first camera robot 1, the second camera robot 2, and the third camera robot 3 selects an operation pattern for the first camera robot 1, the second camera robot 2, and the third camera robot 3 from among a plurality of operation patterns based on a detected attribute of one or more subjects. The one camera robot, notifies the other camera robot of the selected operation pattern. The one camera robot operates according to the selected operation pattern. The other camera robot operates according to the notified operation pattern.

The attribute is, for example, information indicating whether the subject is an adult or a child. The first camera robot 1, the second camera robot 2, and the third camera robot 3 make a first operation pattern and a second operation pattern be different from each other, the first operation pattern being in a case where the one or more subjects are the children only and the second operation pattern being in a case where the one or more subjects are not children only.

Each of the first camera robot 1, the second camera robot 2, and the third camera robot 3 is communicably connected to the server 4 via the network 5. The network 5 is, for example, the Internet. Each of the first camera robot 1, the second camera robot 2, and the third camera robot 3 transmits a captured image to the server 4 via the network 5.

Note that although in the first embodiment, the imaging system includes three camera robots, the present disclosure is not particularly limited thereto, and may include two camera robots or four or more camera robots.

Next, configurations of the first camera robot 1, the second camera robot 2, and the third camera robot 3 according to the first embodiment will be described.

Figure 2:
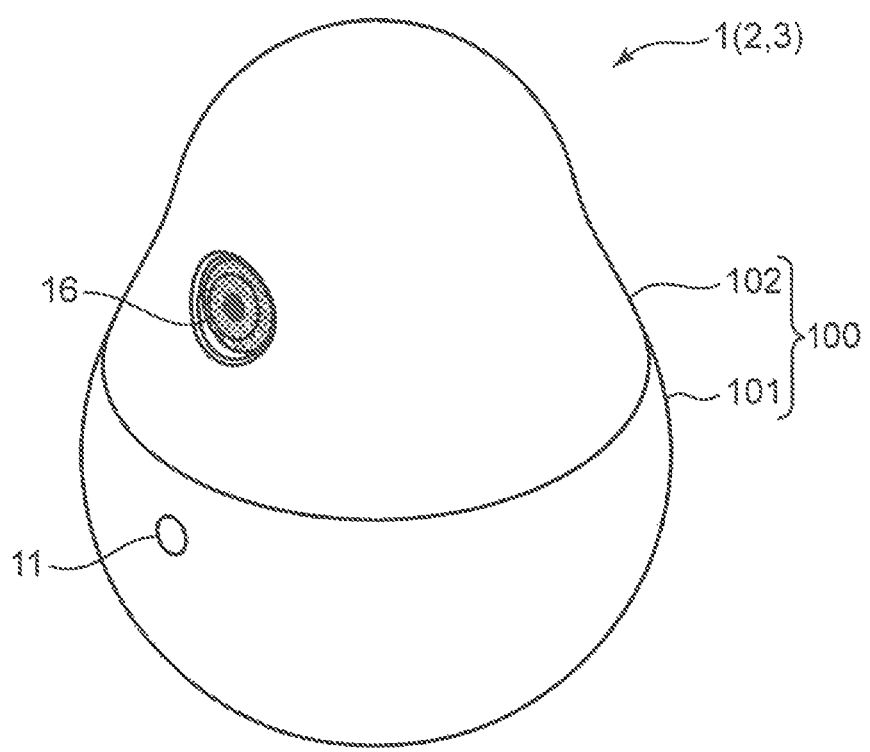
FIG. 2 is a perspective view illustrating an external appearance of a first camera robot according to the first embodiment of the present disclosure.
Figure 3:
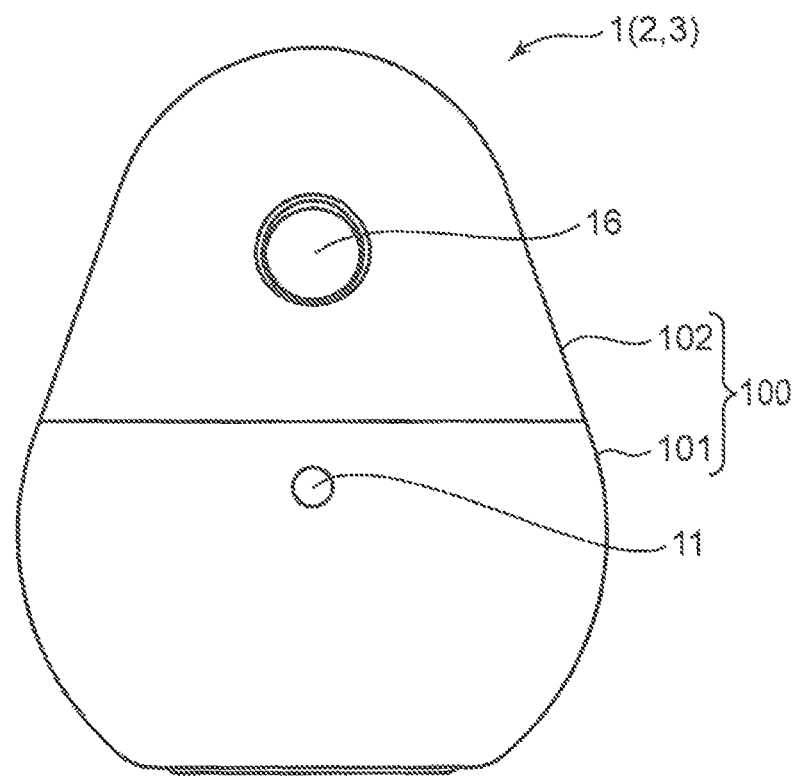
FIG. 3 is a front view illustrating the external appearance of the first camera robot according to the first embodiment of the present disclosure.
Figure 4:
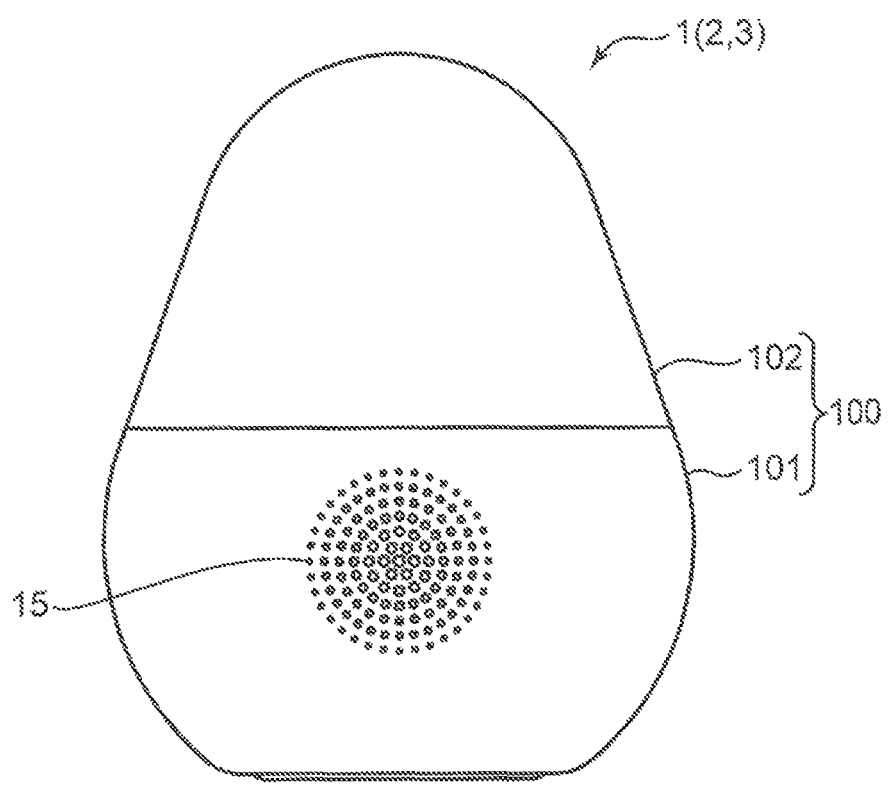
FIG. 4 is a rear view illustrating the external appearance of the first camera robot according to the first embodiment of the present disclosure.

FIG. 2 is a perspective view illustrating an external appearance of the first camera robot according to the first embodiment of the present disclosure, FIG. 3 is a front view illustrating the external appearance of the first camera robot according to the first embodiment of the present disclosure, and FIG. 4 is a rear view illustrating the external appearance of the first camera robot according to the first embodiment of the present disclosure. Since the configurations of the second camera robot 2 and the third camera robot 3 are the same as the configuration of the first camera robot 1, only the configuration of the first camera robot 1 will be described.

A main body 100 of the first camera robot 1 includes a lower casing 101 and an upper casing 102 provided on the lower casing 101. The upper casing 102 is pivotably attached to the lower casing 101. The upper casing 102 turns in a left direction and a right direction with a center line along a vertical direction as a rotation axis by a driver (not illustrated).

The first camera robot 1 includes a camera 11, a speaker 15, and a display 16.

The camera 11 is formed in the main body 100 of the first camera robot 1. The camera 11 is provided on a front side of the lower casing 101. The camera 11 captures one or more subjects around the first camera robot 1.

The speaker 15 is formed in the main body 100 of the first camera robot 1. The speaker 15 is provided on a back side of the lower casing 101. The speaker 15 outputs sound.

The display 16 is formed in the main body 100 of the first camera robot 1. The display 16 is provided on a front side of Ute upper casing 102. The display 16 is a circular-shaped liquid crystal display device and displays an image imitating a human eye. The display 16 changes a type of eye to be displayed according to a facial expression to be presented.

Figure 5:
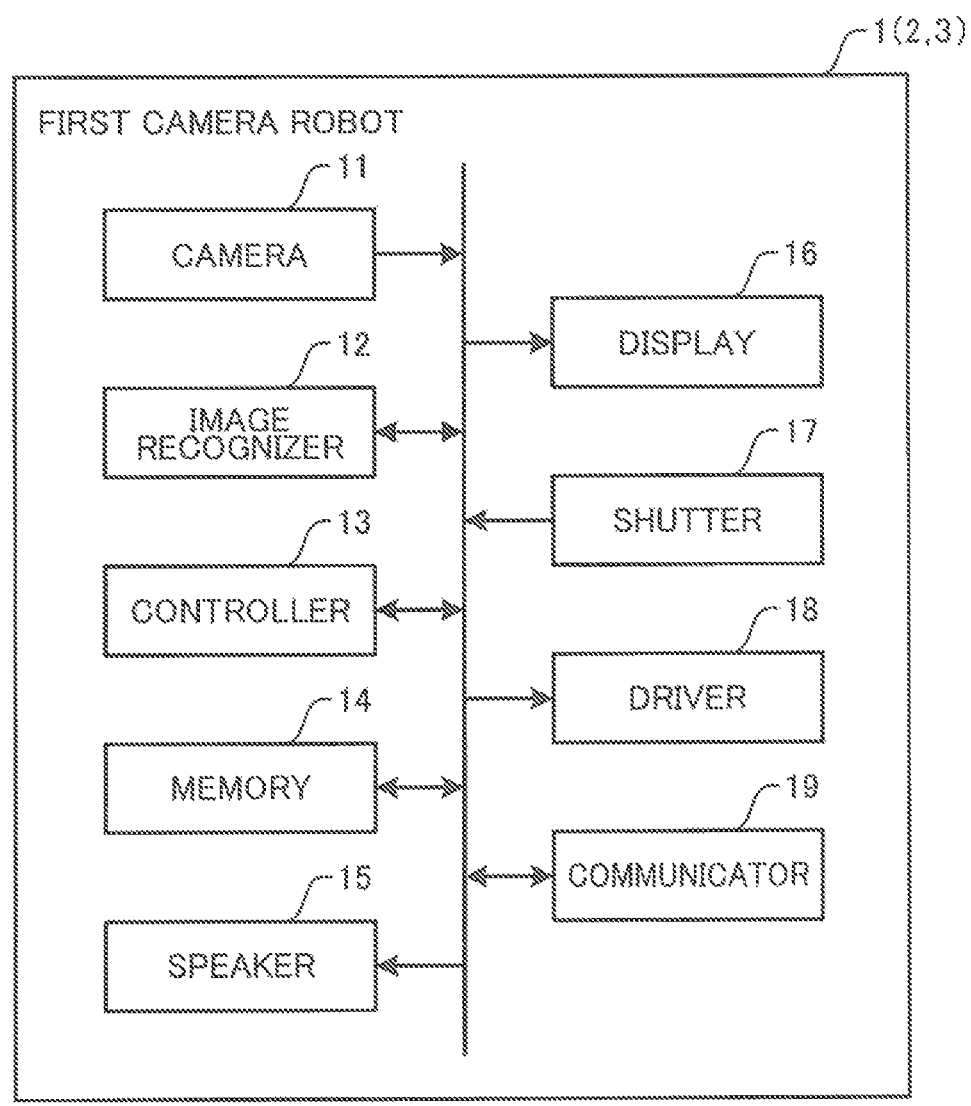
FIG. 5 is a block diagram illustrating a configuration of the first camera robot according to the first embodiment of the present disclosure.

FIG. 5 is a block diagram illustrating a configuration of the first camera robot according to the first embodiment of the present disclosure.

The first camera robot 1 illustrated in FIG. 5 includes the camera 11, an image recognizer 12, a controller 13, a memory 14, the speaker 15, the display 16, a shutter 17, a driver 18, and a communicator 19.

The camera 11 captures an image of the surroundings of the first camera robot 1.

The image recognizer 12 detects one or more subjects from within the image captured by the camera 11. The subject is a person. Furthermore, the image recognizer 12 recognizes an attribute of the detected one or more subjects. The attribute is either a child or an adult. The image recognizer 12 recognizes whether the attribute of one or more subjects in the captured image is a child or an adult based on features of a person such as a face, a height, and a body shape. The child is, for example, a person of 15 years old or younger. The child may be, for example, a person of 12 years old or younger, or an infant from 1 year old to 6 years old.

The controller 13 selects an operation pattern of the camera robot based on an attribute of one or more subjects detected by the image recognizer 12. In a case where the one or more subjects detected by the image recognizer 12 are children only, the controller 13 selects the first operation pattern, and in a case where the one or more subjects detected by the image recognizer 12 are not children only, the controller selects the second operation pattern having an operation amount of the camera robot smaller than the first operation pattern.

The memory 14 stores in advance a drive pattern for turning the upper casing 102, an image representing a facial expression to be displayed on the display 16, and sound output from the speaker 15 in association with each of the plurality of operation patterns.

The controller 13 causes the first camera robot 1 to operate according to a selected operation pattern. The controller 13 outputs a control signal corresponding to a drive pattern associated with the selected operation pattern to the driver 18, outputs an image associated with the selected operation pattern to the display 16, and outputs sound associated with the selected operation pattern to the speaker 15.

The speaker 15 outputs sound input from the controller 13. The speaker 15 outputs a predetermined sound associated with the selected operation pattern.

The display 16 displays an image input from the controller 13. The display 16 displays an image representing a predetermined facial expression associated with the selected operation pattern.

The driver 18 drives a part of the main body 100 of the first camera robot 1. The driver 18 turns the upper casing 102 according to the control signal input from the controller 13. The driver 18 drives a part of the main body 100 according to a predetermined drive pattern associated with the selected operation pattern.

The controller 13 causes the display 16 to display the image representing the predetermined facial expression according to the selected operation pattern, causes the speaker 15 to output the predetermined sound, and causes the driver 18 to drive a part of the main body 100 according to the predetermined drive pattern.

While the first camera robot 1 and the other camera robots (the second camera robot 2 and the third camera robot 3) are operating according to a selected operation pattern, the shutter 17 causes the camera 11 to output an image obtained by capturing one or more subjects. The camera 11 outputs an image obtained by capturing one or more subjects while the first camera robot 1 and the other camera robots (the second camera robot 2 and the third camera robot 3) are operating according to the selected operation pattern. The camera 11 outputs an image obtained by capturing one or more subjects to the communicator 19.

When operation according to an operation pattern selected by the controller 13 is started, the shutter 17 causes the camera 11 to start outputting a captured image. The shutter 17 causes the captured image to be output every one second, in a case where one or more subjects are no longer detected by the image recognizer 12, the shutter 17 causes the outputting of the captured image by the camera 11 to end. Furthermore, in a case where one or more subjects are no longer detected by the image recognizer 12, the controller 13 causes the operation of the first camera robot 1 according to the operation pattern to end.

Note that the camera 11 may output an image obtained by capturing one or more subjects to the memory 14. In this case, the memory 14 may store an image obtained by capturing one or more subjects. In a case where an image obtained by capturing one or more subjects is stored in the memory 14, the imaging system may not include the server 4.

The communicator 19 transmits, to the other camera robots (the second camera robot 2 and the third camera robot 3), operation start instruction information for causing the other camera robots (the second camera robot 2 and the third camera robot 3) to operate in accordance with an operation pattern selected by the controller 13. The communicator 19 also transmits the captured image output from the camera 11 to the server 4.

Furthermore, the communicator 19 receives, from another camera robot (the second camera robot 2 or the third camera robot 3), operation start instruction information for causing the first camera robot 1 to operate according to an operation pattern selected by the other camera robot (the second camera robot 2 or the third camera robot 3). The controller 13 causes the first camera robot 1 to operate according to an operation pattern included in the operation start instruction information received by the communicator 19.

When the image recognizer 12 no longer detects one or more subjects, the controller 13 causes the communicator 19 to transmit, to the other camera robots (the second camera robot 2 and the third camera robot 3), operation end instruction information for ending operation of the other camera robots (the second camera robot 7 and the third camera robot 3). The communicator 19 transmits the operation end instruction information to the other camera robots (the second camera robot 2 and the third camera robot 3).

The communicator 19 also receives the operation end instruction information from the other camera robot (the second camera robot 2 or the third camera robot 3). When the operation end instruction information is received by the communicator 19, the controller 13 causes the operation of the first camera robot 1 according to the operation pattern to end.

Note that the memory 14 may store, in advance, a face image of a resident of a house where the first camera robot 1 is installed and attribute information indicating whether the resident is an adult or a child in association with each other. The image recognizer 12 may recognize a face of one or more subjects in a captured image using the face image stored in the memory 14, and recognize whether the recognized face is a child or an adult. This enables more accurate attribute identification.

In the first embodiment, a camera robot that has transmitted the operation start instruction information serves as a main camera robot, and a camera robot that has received the operation start instruction information serves as a sub-camera robot. The sub-camera robot operates according to an operation pattern included in the operation start instruction information received from the main camera robot, and outputs the captured image. In other words, among the plurality of camera robots, one camera robot that has detected one or more subjects earliest becomes the main camera robot, and the other camera robots become the sub-camera robots. The sub-camera robot follows an instruction from the main camera robot.

Note that the priority order may be assigned to a plurality of camera robots. When at least one of the plurality of camera robots detects one or more subjects, a camera robot with the highest priority among the plurality of camera robots may be the main camera robot.

When detecting one or more subjects, the first camera robot 1 may calculate a distance to a subject closest to the first camera robot 1 among the one or more subjects as a subject distance, and transmit the calculated subject distance to the other camera robot. The first camera robot 1 may then receive a subject distance calculated by the other camera robot. The first camera robot 1 may determine, as the main camera robot, a camera robot having the shortest subject distance among a subject distance calculated by the first camera robot itself and subject distances received from other camera robots. For example, in a case where a subject distance calculated by the first camera robot 1 is the shortest, the first camera robot 1 may determine itself as a main camera robot. On the other hand, in a case where a subject distance calculated by the other camera robot is the shortest, the first camera robot 1 may determine itself as a sub-camera robot.

Next, operation of the imaging system according to the first embodiment of the present disclosure will be described.

Figure 6:
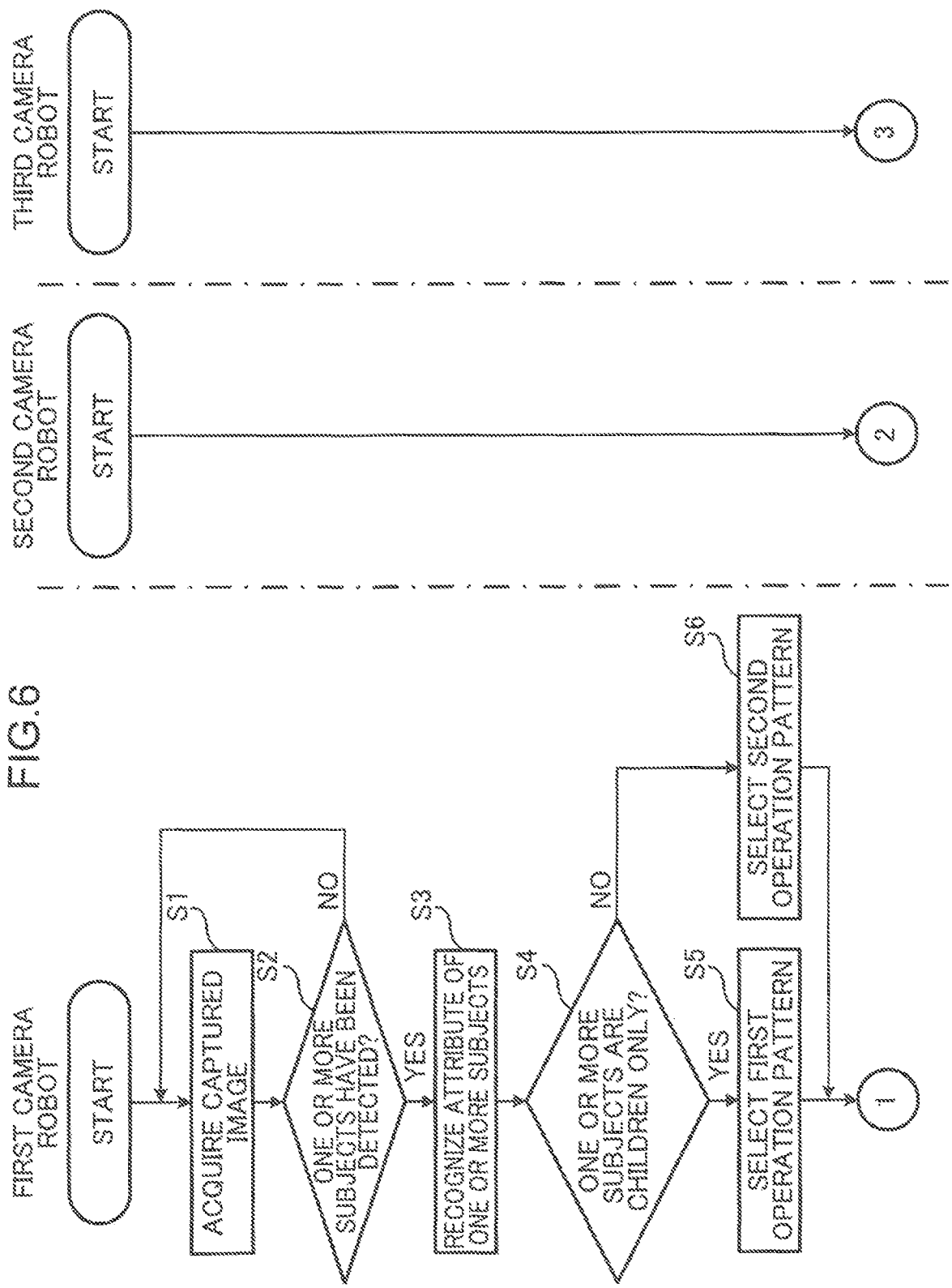
FIG. 6 is a first flowchart for explaining operation of the imaging system according to the first embodiment of the present disclosure.
Figure 7:
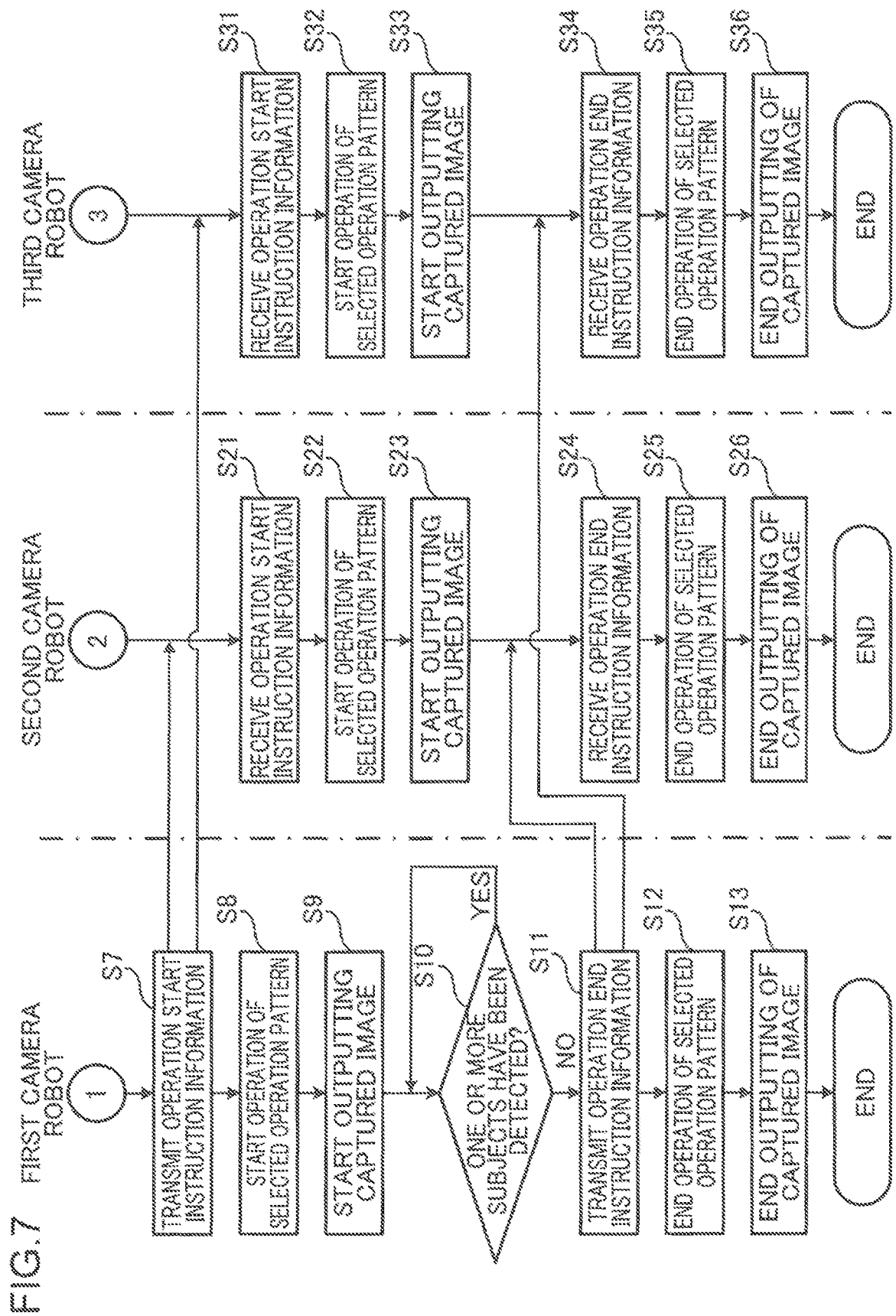
FIG. 7 is a second flowchart for explaining the operation of the imaging system according to the first embodiment of the present disclosure.

FIG. 6 is a first flowchart for explaining operation of the imaging system in the first embodiment of the present disclosure, and FIG. 7 is a second flowchart for explaining the operation of the imaging system in the first embodiment of the present disclosure, in the description of FIG. 6 and FIG. 7, the first, camera robot 1 is a main camera robot, and the second camera robot 2 and the third camera robot 3 are sub-camera robots.

First, in Step S1, the camera 11 of the first camera robot 1 acquires a captured image of the surroundings. The camera 11 outputs the acquired captured image to the image recognizer 12.

Next, in Step S2, the image recognizer 12 determines whether or not one or more subjects have been detected from the captured image. The subject in the first embodiment is a person. Here, when the determination is made that one or more subjects are not detected from the captured image (NO in Step S2), the processing returns to Step S1.

On the other hand, when the determination is made that one or more subjects have been detected from the captured image (YES in Step S2), the image recognizer 12 recognizes whether an attribute of the detected one or more subjects is a child or an adult in Step S3.

Next, in Step S4, the controller 13 determines whether or not the one or more subjects recognized by the image recognizer 12 are children only.

Here, when the determination is made that the one or more subjects are children only (YES in Step S4), the controller 13 selects the first operation pattern in Step S5. The first operation patient is an operation pattern representing a situation where the first camera robot 1, the second camera robot 2, and the third camera robot 3 make noise.

On the other hand, when the determination is made that the one or more subjects are not children only, i.e., when the determination is made that the one or more subjects include an adult and a child, or when the determination is made that the one or more subjects are adults only (NO in Step S4), the controller 13 selects the second operation pattern different from the first operation pattern in Step S6. The second operation pattern is an operation pattern representing a situation where the first camera robot 1, the second camera robot 2, and the third camera robot 3 are calm.

Next, in Step S7, the communicator 19 transmits, to the second camera robot 2 and the third camera robot 3, the operation start instruction information for causing the second camera robot 2 and the third camera robot 3 to operate according to the operation pattern selected by the controller 13.

Next, in Step S8, the controller 13 starts operation of the selected operation pattern. When selecting the first operation pattern, the controller 13 outputs a control signal corresponding to a drive pattern associated with the first operation pattern to the driver 18, outputs an image associated with the first operation pattern to the display 16, end outputs sound associated with the first operation pattern to the speaker 15.

The first operation pattern is associated with, for example, a drive pattern of repeating operation of relating the upper casing 102 at a predetermined angle in one direction and at a predetermined angle in the other direction.

In addition, for example, an image imitating a smiling eye is associated with the first operation pattern.

Figure 8:
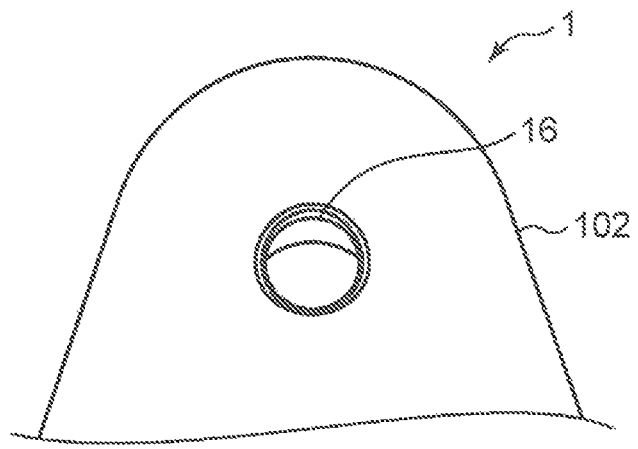
FIG. 8 is a view illustrating an example of an image displayed on a display when a first operation pattern is selected in the first embodiment.

FIG. 8 is a view illustrating an example of an image displayed on the display when the first operation pattern is selected in the first embodiment.

As illustrated in FIG. 8, when the first operation pattern is selected, the display 16 displays an image imitating a smiling eye.

Furthermore, the first operation pattern is associated with, for example, music that makes a child happy.

Further, when selecting the second operation pattern, the controller 13 outputs a control signal corresponding to a drive pattern associated with the second operation pattern to the driver 18, outputs an image associated with the second operation pattern to the display 16, and outputs sound associated with the second operation pattern to the speaker 15. The second operation pattern is associated with, for example, a drive pattern of refraining front causing the upper casing 102 to operate.

In addition, for example, an image imitating a watery eye is associated with the second operation pattern.

Figure 9:
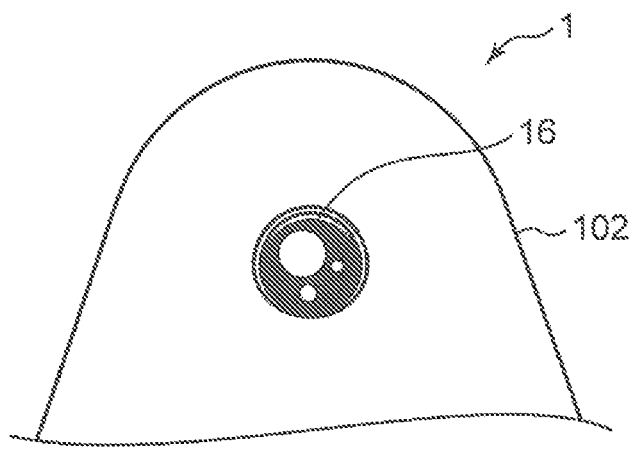
FIG. 9 is a view illustrating an example of an image displayed on the display when a second operation pattern is selected in the first embodiment.

FIG. 9 is a view illustrating an example of an image displayed on the display when the second operation pattern is selected in the first embodiment.

As illustrated in FIG. 9, when the second operation pattern is selected, the display 16 displays an image imitating a watery eye.

Furthermore, for example, silence or soft music is associated with the second operation pattern.

Returning to FIG. 7, next, in Step S9, the shutter 17 starts outputting of the captured image by the camera 11. Note that the shutter 17 causes the camera 11 to output a captured image to the communicator 19, for example, every one second. The communicator 19 transmits the captured image acquired from the camera 11 to the server 4 every one second. Note that the shutter 17 causes the captured image to be output while the first camera robot 1 is operating according to the selected operation pattern, i.e., during a period from the start of imaging until one or more subjects are no longer detected in the captured image.

In Step S21, the communicator 19 of the second camera robot 2 receives the operation start instruction information transmitted by the first camera robot 1. The operation start instruction information includes information for specifying the operation pattern selected by the first camera robot 1.

Next, in Step S22, the controller 13 starts the operation of the operation pattern selected by the first camera robot 1. When the first operation pattern is selected by the first camera robot 1, the controller 13 outputs the control signal corresponding to the drive pattern associated with the first operation pattern to the driver 18, outputs the image associated with five first operation pattern to the display 16, and outputs the sound associated with the first operation pattern to the speaker 15. The first operation pattern in the second camera robot 2 is the same as the first operation pattern in the first camera robot 1.

When the second operation pattern is selected by the first camera robot 1, the controller 13 outputs the control signal corresponding to the drive pattern associated with the second operation pattern to the driver 18, outputs the image associated with the second operation pattern to the display 16, and outputs the sound associated with the second operation pattern to the speaker 15. The second operation pattern in the second camera robot 2 is the same as the second operation pattern in the first camera robot 1.

Next, in Step S23, the shutter 17 starts outputting of the captured image by the camera 11. Note that the shutter 17 causes the camera 11 to output a captured image to the communicator 19, for example, every one second. The communicator 19 transmits the captured image acquired from the camera 11 to the server 4 every one second. The shutter 17 causes the captured image to be output while the second camera robot 2 is operating according to the selected operation pattern, i.e., during a period from the start of imaging until one or more subjects are no longer detected in the captured image (until the operation end instruction information is received).

In Step S31, the communicator 19 of the third camera robot 3 receives the operation start instruction information transmitted by the first camera robot 1.

Note that the processing in Step S31 to Step S33 by the third camera robot 3 is the same as the processing in Step S21 to Step S23 by the second camera robot 2.

As described above, in a case where the one or more subjects are children only, the first camera robot 1, the second camera robot 2, and the third camera robot 3 create a situation of having fun and making noise. This enables the first camera robot 1, the second camera robot 2, and the third camera robot 3 to make one or more children feel happy and bring out a good facial expression from one or more children. Then, outputting of the captured image in such a situation of having fun and making noise enables the server 4 to acquire a captured image of a good facial expression from one or more children.

In addition, in a case where the one or more subjects are not children only, the first camera robot 1, the second camera robot 2, and the third camera robot 3 create a calm situation. This enables the first camera robot 1, the second camera robot 2, and the third camera robot 3 to create different situations in a case where there are children only and in a case where there is an adult, and to prevent one or more children from becoming bored.

Next, in Step S10, the image recognizer 12 of the first camera robot 1 determines whether or not one or more subjects have been detected from the captured image. Here, when the determination is made that one or more subjects have been detected from the captured image (YES in Step S10), the processing of Step S10 is repeated, and the operation of the selected operation pattern and the outputting of the captured image are continuously performed.

On the other hand, when the determination is made that one or more subjects have not been detected from the captured image (NO in Step S10), the communicator 19 transmits, to the second camera robot 2 and the third camera robot 3, the operation end instruction information for ending the operations of the second camera robot 2 and the third camera robot 3 according to the operation pattern in Step S11.

Next, in Step S12, the controller 13 ends the operation of the selected operation pattern.

Next, in Step S13, the shutter 17 ends the outputting of the captured image by the camera 11.

In Step S24, the communicator 19 of the second camera robot 2 receives the operation end instruction information transmitted by the first camera robot 1.

Next, in Step S25, the controller 13 ends the operation of the operation pattern selected by the first camera robot 1.

Next, in Step S26, the shutter 17 ends the outputting, of the captured image by the camera 11.

In Step S34, the communicator 19 of the third camera robot 3 receives the operation end instruction information transmitted by the first camera robot 1.

Note that the processing in Step S34 to Step S36 by the third camera robot 3 is the same as the processing in Step S24 to Step S26 by the second camera robot 2.

As described above, the operation pattern of the first camera robot 1 is selected based on an attribute of one or more subjects, the first camera robot 1 and the other robots (the second camera robot 2 and the third camera moot 3) operate according to the selected operation pattern, and an image obtained by capturing one or more subjects is output while the first camera robot 1 and the other robots (the second camera robot 2 and the third camera robot 3) operate according to the selected operation pattern.

Therefore, since the plurality of camera robots (the first camera robot 1, the second camera robot 2, and the third camera robot 3) simultaneously operate according to the selected operation pattern, a space with a pleasant atmosphere can be provided to one or more subjects, and a good facial expression can be brought out from one or more subjects.

In the first embodiment, the memory 14 may store installation location information indicating an installation location of the first camera robot 1 and personality information indicating a personality set in the first camera robot 1 in advance. The communicator 19 may receive installation location information and personality information of the other camera robots (the second camera robot 2 and the third camera robot 3) from the other robots (the second camera robot 2 and the third camera robot 3). In this case, when the installation location of the first camera robot 1 is the same as the installation location of the other robot (the second camera robot 2 or the third camera robot 3), the controller 13 may change an operation amount of a selected operation pattern based on personality of the first camera robot 1 and personality of the other robot (the second camera robot 2 or the third camera robot 3).

The installation location is, for example, a table in a living room, a shelf in the living room, or the like. The installation location is input by a user. There are three types of personality, for example, "noisy", "ordinary", and "calm". The personality may be input by the user or may be set in advance. There are a combination of compatible personalities and a combination of incompatible personalities. For example, a combination of "noisy" and "noisy", a combination of "ordinary" and "ordinary", and a combination of "calm" and "calm" are compatible. A combination of "noisy" and "calm" is incompatible.

In a case where there is another camera robot having the same installation location as the first camera robot 1 and having a personality set to be compatible with the first camera robot 1, the controller 13 may increase the operation amount in the selected operation pattern by 10%. Furthermore, in a case where there is another camera robot having the same installation location as the first camera robot 1 and having a personality set to be incompatible with the first camera robot 1, the controller 13 may decrease the operation amount in the selected operation pattern by 10%. For example, the driver 18 may increase or decrease an angle at which the upper casing 102 is turned by 10%, and may increase or decrease a speed at which the upper casing 102 is turned by 10%. Furthermore, the speaker 15 may increase or decrease the volume of the sound to be output by 10%.

Furthermore, in the first embodiment, the imaging system may further include a terminal device. The terminal device is, for example, a smartphone or a tablet computer, and is used by a user. The server 4 may transmit images captured by a plurality of camera robots to the terminal device. The terminal device may receive the captured image transmitted by the server 4, and store and/or display the received captured image.

In addition, the terminal device may accept selection of a captured image preferred by the user from among a plurality of captured images accumulated in the server 4. The server 4 may transmit only the captured image selected by the user to the terminal device. Furthermore, the server 4 may create an identification model by learning a plurality of captured images selected by the user as teacher data. Then, the server 4 may input the plurality of captured images received from the plurality of camera robots to the identification model and transmit the captured image output from the identification model to the terminal device. As a result, a captured image preferred by the user can be automatically extracted, enabling the user to save time and effort for selecting the captured image.

Second Embodiment

Next, an imaging system according to a second embodiment of the present disclosure will be described.

In the second embodiment, in addition to the first operation pattern and the second operation pattern of the first embodiment, a third operation pattern and a fourth operation pattern are selected which represent a situation in which one of a plurality of camera robots is lifted.

Figure 10:
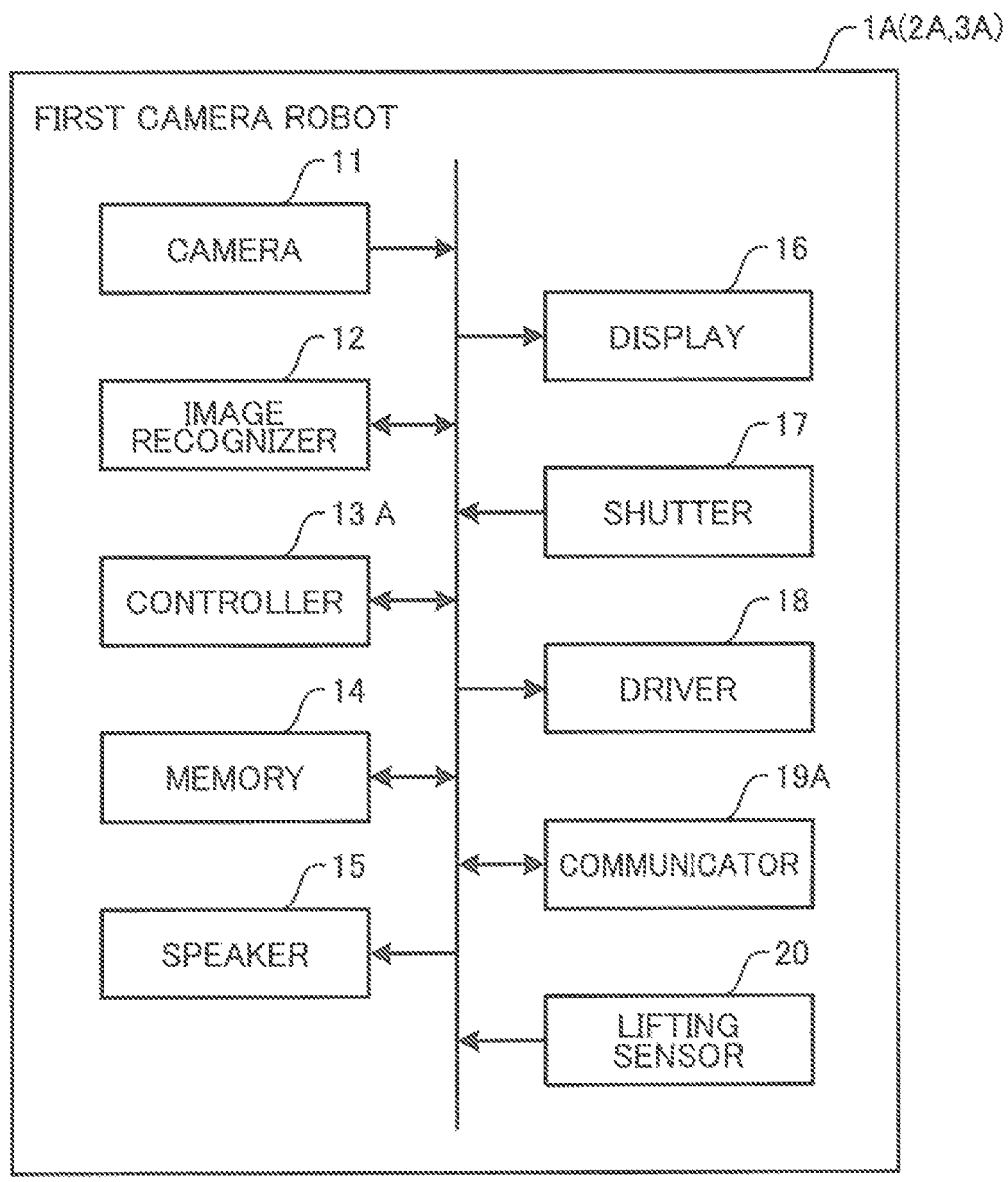
FIG. 10 is a block diagram illustrating a configuration of a first camera robot according to a second embodiment of the present disclosure.

FIG. 10 is a block diagram illustrating a configuration of a first camera robot according to the second embodiment of the present disclosure. The imaging system according to the second embodiment includes a first camera robot 1A, a second camera robot 2A, a third camera robot 3A, and a server 4. Since the configurations of the second camera robot 2A and the third camera robot 3A are the same as the configuration of the first camera robot 1A, only the configuration of the first camera robot 1A will be described. In the second embodiment, the same components as those in the first embodiment are denoted by the same reference numerals, and the description thereof will be omitted.

The first camera robot 1A illustrated in FIG. 10 includes a camera 11, an image recognizer 12, a controller 13A, a memory 14, a speaker 15, a display 16, a shutter 17, a driver 18, a communicator 19A, and a lifting sensor 20.

The lifting sensor 20 detects the first camera robot 1A being lifted. The lifting sensor 20 is, for example, an optical sensor, and is provided on a bottom surface of the lower casing 101. When detecting the first camera robot 1A being lifted, the lifting sensor 20 outputs a first detection signal to the controller 13A.

The lifting sensor 20 also detects the lifted first camera robot 1A being put down. When detecting the first camera robot 1A being put down, the lifting sensor 20 outputs a second detection signal to the controller 13A.

In a case where the lifting sensor 20 detects the first camera robot 1A being lifted, the controller 13A selects the third operation pattern of reacting, to the lifting. In a case where the first detection signal is input from the lifting sensor 20, the controller 13A switches the first operation pattern or the second operation pattern to the third operation pattern. At this time, the controller 13A stores, in the memory 14, an operation pattern operating before the first camera robot 1A is lifted.

In addition, in a case where the lifting sensor 20 detects the first camera robot 1A being put down, the controller 13A selects the operation pattern operating before the first camera robot 1A is lifted. In a case where the second detection signal is input from the lifting sensor 20, the controller 13A switches the third operation pattern to the operation pattern stored in the memory 14, the operation pattern operating before the first camera robot 1A is lifted.

The communicator 19A transmits lifting information indicating that the first camera robot 1A is lifted to the other camera robots (the second camera robot 2 and the third camera robot 3).

The communicator 19A receives the lifting information from the other camera robots (the second camera robot 2 and the third camera robot 3). In a case where the lifting information from the other camera robots (the second camera robot 2 and the third camera robot 3) is received, the controller 13A selects the fourth operation pattern of reacting to lifting of the other camera robots (the second camera robot 2 and the third camera robot 3).

Furthermore, the communicator 19A transmits placement information indicating that the lifted first camera robot 1A is put down, to the other camera robots (the second camera robot 2 and the third camera robot 3). The placement information includes the operation pattern operating before the first camera robot 1 is lifted.

The communicator 19A receives the placement information from the other camera robots (the second camera robot 2 and the third camera robot 3). In a case where the placement information from the other camera robots (the second camera robot 2 and the third camera robot 3) is received, the controller 13A selects an operation pattern operating before the other camera robots (the second camera robot 2 and the third camera robot 3) are lifted. At this time, the placement information includes the operation pattern operating before the other camera robots (the second camera robot 2 and the third camera robot 3) are lifted.

Next, operation of the imaging system according to the second embodiment of the present disclosure will be described.

Figure 11:
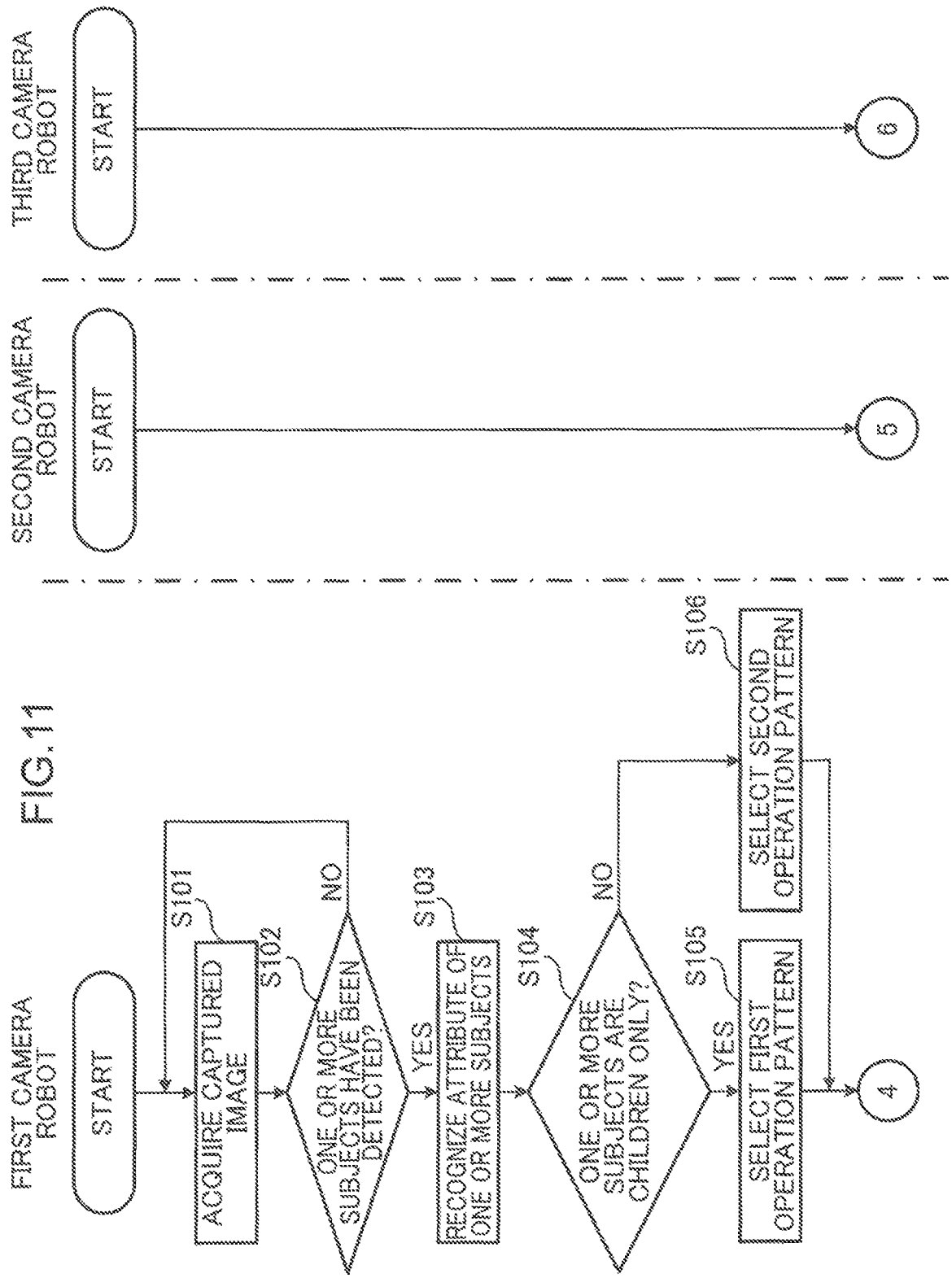
FIG. 11 is a first flowchart for explaining operation of an imaging system according to the second embodiment of the present disclosure.
Figure 12:
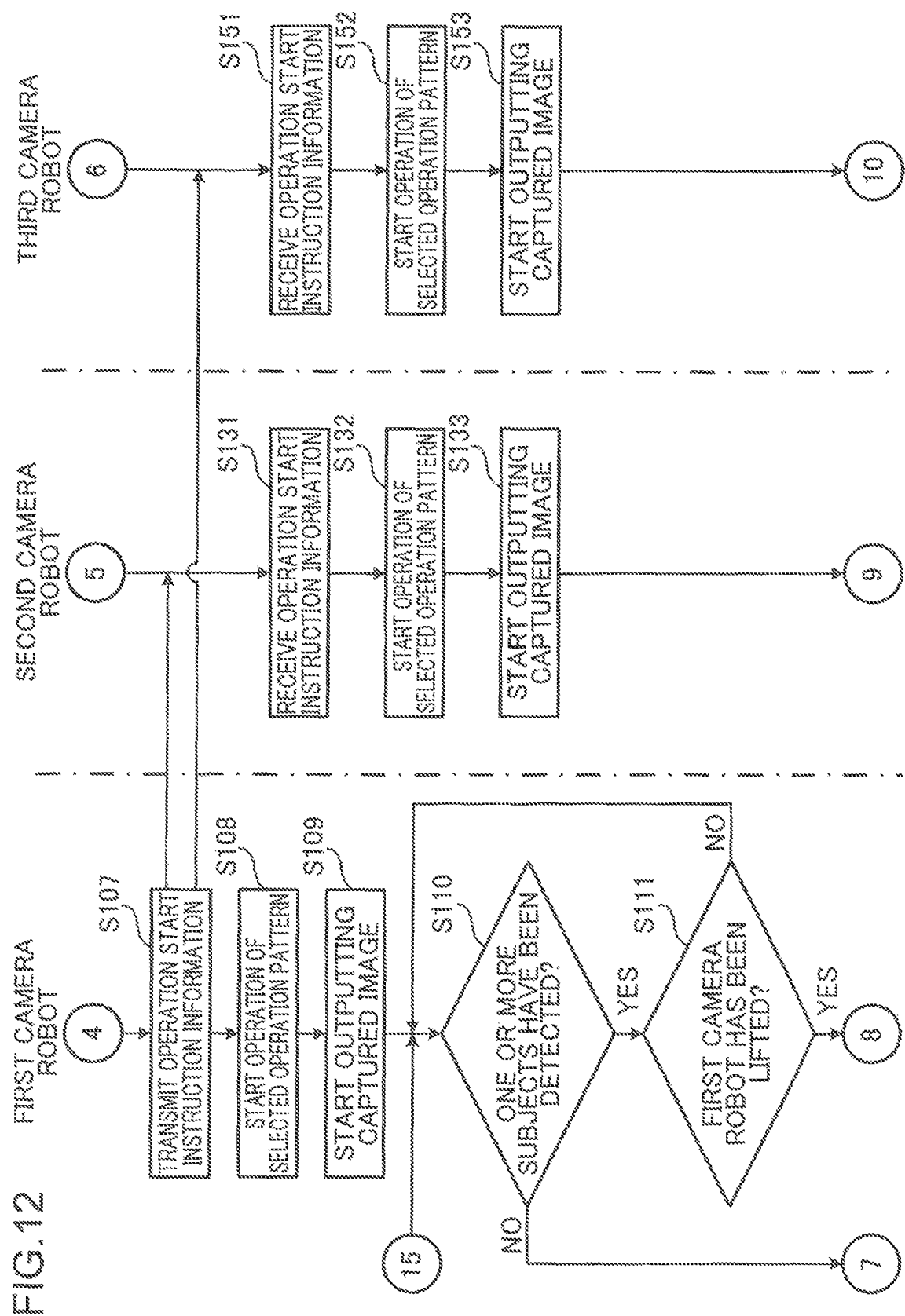
FIG. 12 is a second flowchart for explaining the operation of the imaging system according to the second embodiment of the present disclosure.
Figure 13:
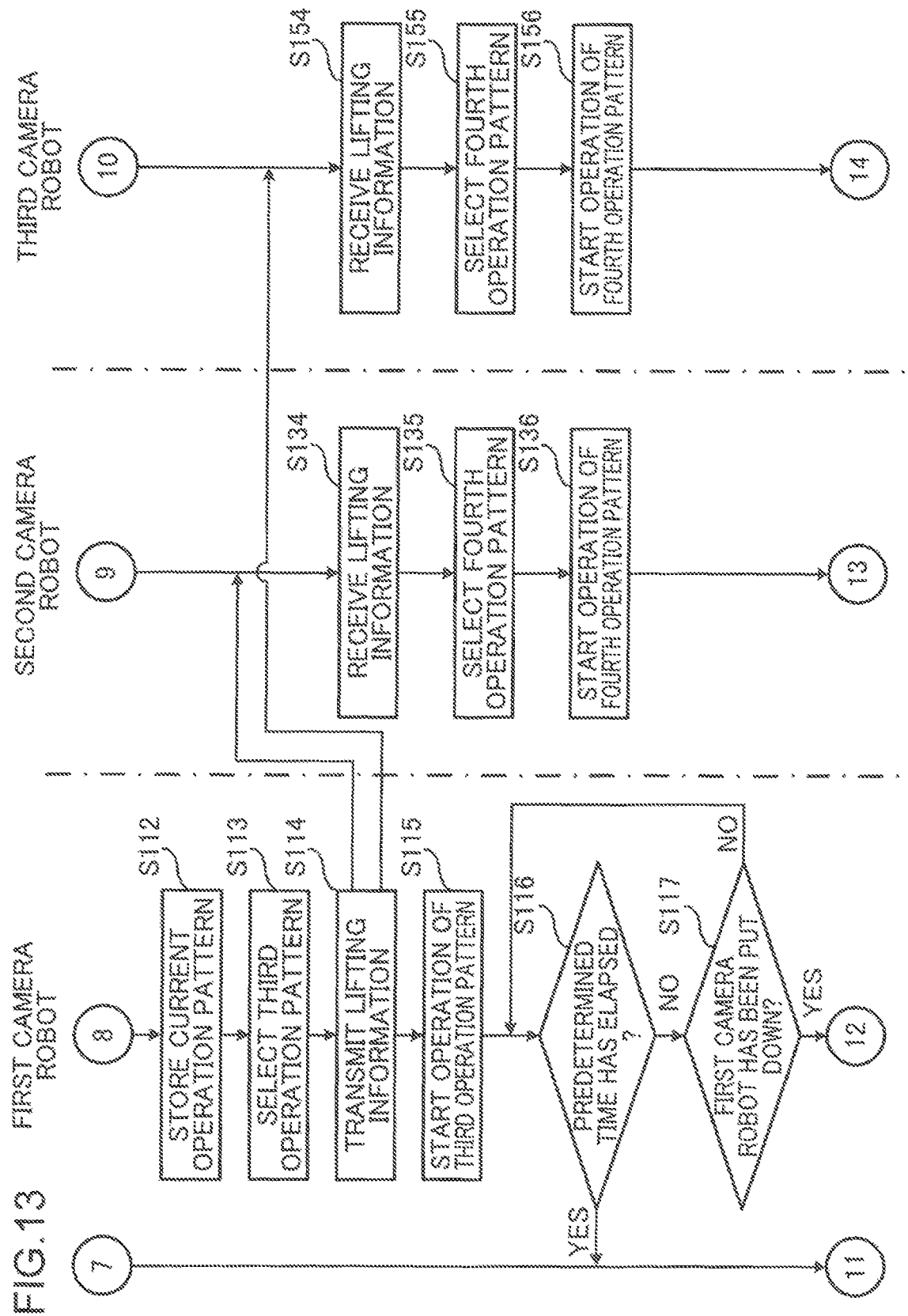
FIG. 13 is a third flowchart for explaining the operation of the imaging system according to the second embodiment of the present disclosure.
Figure 14:
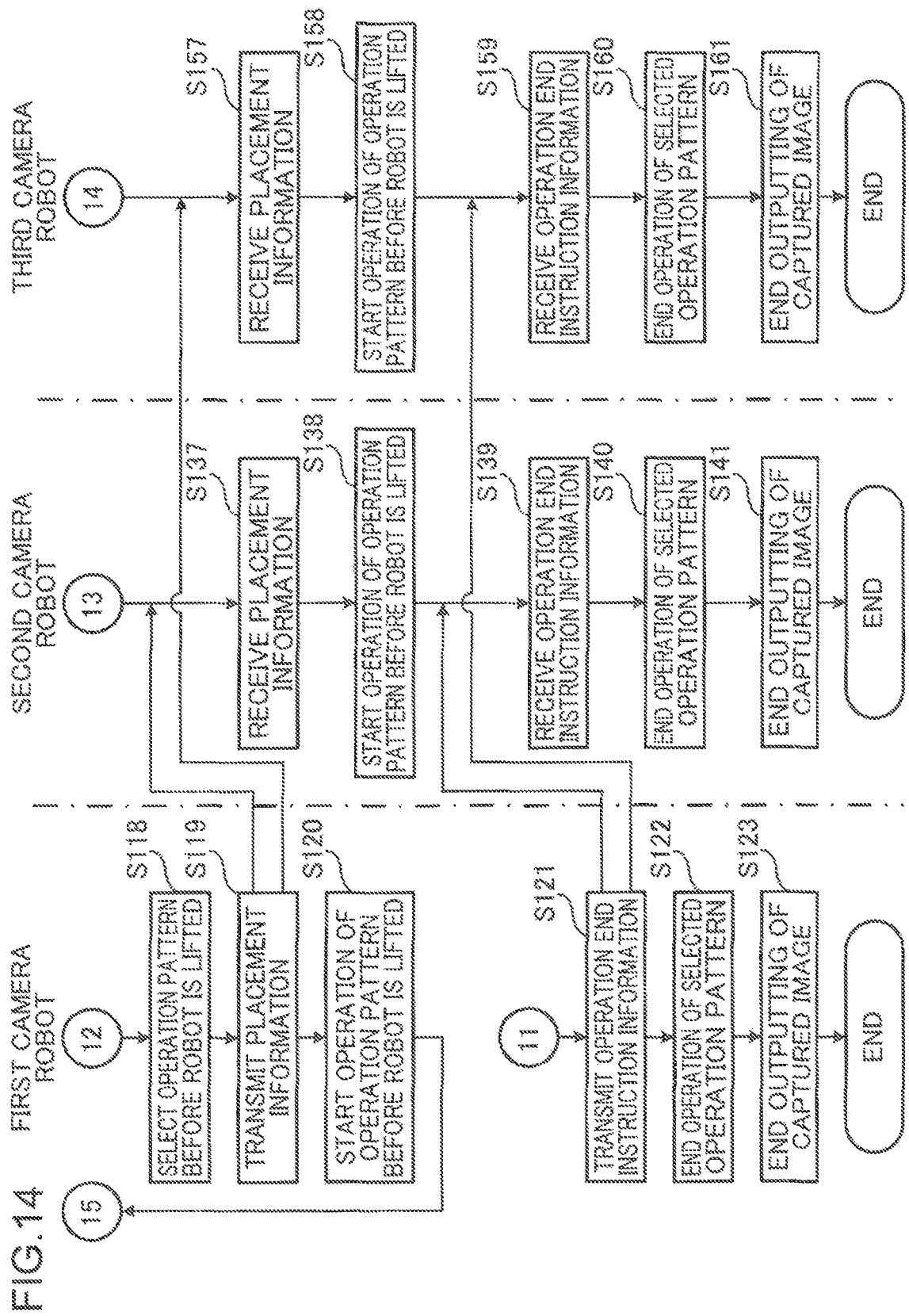
FIG. 14 is a fourth flowchart for explaining the operation or the imaging system according to the second embodiment of the present disclosure.

FIG. 11 is a first flowchart for explaining operation of the imaging system in the second embodiment of the present disclosure, FIG. 12 is a second flowchart for explaining the operation of the imaging system in the second embodiment of the present disclosure, FIG. 13 is a third flowchart for explaining the operation of the imaging system in the second embodiment of the present disclosure, and FIG. 14 is a fourth flowchart for explaining the operation of the imaging system in the second embodiment of the present disclosure. In the description of FIG. 11 to FIG. 14, the first camera robot 1A is a main camera robot, and the second camera robot 2A and the third camera robot 3A are sub-camera robots.

Processing in Step S101 to Step S109 is the same as the processing in Step S1 to Step S9 in FIG. 6 and FIG. 7. Further, processing in Step S131 to Step S133 is the same as the processing in Step S21 to Step S23 in FIG. 7. Further, processing in Step S151 to Step S153 is the same as the processing in Step S31 to Step S33 in FIG. 7.

Next, in Step S110, the image recognizer 12 of the first camera robot 1A determines whether or not one or more subjects have been detected from the captured image. Here, when the determination is made that one or more subjects are not detected from the captured image (NO in Step S110), the processing proceeds to Step S121.

On the other hand, when the determination is made that one or more subjects have been detected from the captured image (YES in Step S110), the controller 13A determines whether or not the first camera robot 1A has been lifted in Step S111. When the lifting sensor 20 detects the first camera robot 1A being lifted, the controller 13A determines that the find camera robot 1A is lifted.

Here, when the determination is made that the first camera robot 1A is not lifted (NO in Step S111), the processing returns to Step S110.

On the other hand, when the determination is made that the first camera robot 1A has been lifted (YES in Step S111), the controller 13A stores, in the memory 14, a current operation pattern, i.e., an operation pattern before the first camera robot 1A is lifted in Step S112.

Next, in Step S113, the controller 13A selects the third operation pattern. The third operation pattern is an operation pattern representing a situation in which (the first camera robot 1A) itself reacts to its own lifting.

Next, in Step S114, the communicator 19A transmits lifting information indicating that the first camera robot 1A is lifted to the second camera robot 2 and the third camera robot 3.

Next, in Step S115, the controller 13A starts the operation of the third operation pattern. The controller 13A outputs a control signal corresponding to a drive pattern associated with the third operation pattern to the driver 18, outputs an image associated with the third operation pattern to the display 16, and outputs sound associated with the third operation pattern to the speaker 15.

The third operation pattern is associated with, for example, a drive pattern of repeating operation of rotating the upper casing 102 at a predetermined angle in one direction and at a predetermined angle in the other direction.

In addition, for example, an image imitating a refusing eye is associated with the third operation pattern.

Figure 15:
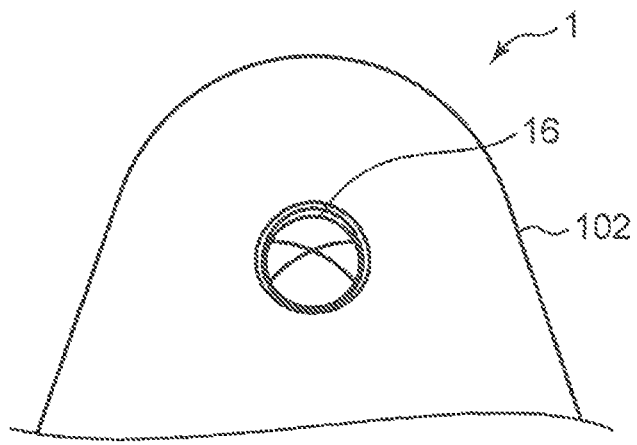
FIG. 15 is a view illustrating an example of an image displayed on a display when a third operation pattern is selected in the second embodiment.

FIG. 15 is a view illustrating an example of an image displayed on the display when the third operation pattern is selected in the second embodiment.

As illustrated in FIG. 15, when the third operation pattern is selected, the display 16 displays an image imitating a refusing eye.

The third operation pattern is associated with, for example, a buzzer sound or a weeping voice.

Returning to FIG. 13, in Step S134, the communicator 19A of the second camera robot 2A receives the lifting information transmitted by the first camera robot 1.

Next, in Step S135, the controller 13A selects the fourth operation pattern. The fourth operation pattern is an operation pattern representing a situation of reacting to lifting of other camera robot (the first camera robot 1A).

Next, in Step S136, the controller 13A starts the operation of the fourth operation pattern. The controller 13A outputs a control signal corresponding to a drive pattern associated with the fourth operation pattern to the driver 18, outputs in image associated with the fourth operation pattern to the display 16, and outputs sound associated with the fourth operation pattern to the speaker 15.

The fourth operation pattern is associated with, for example, a drive pattern of repeating operation of rotating the upper casing 102 at a predetermined angle in one direction and at a predetermined angle in the other direction.

For example, an image imitating an angry eye is associated with the fourth operation pattern.

Figure 16:
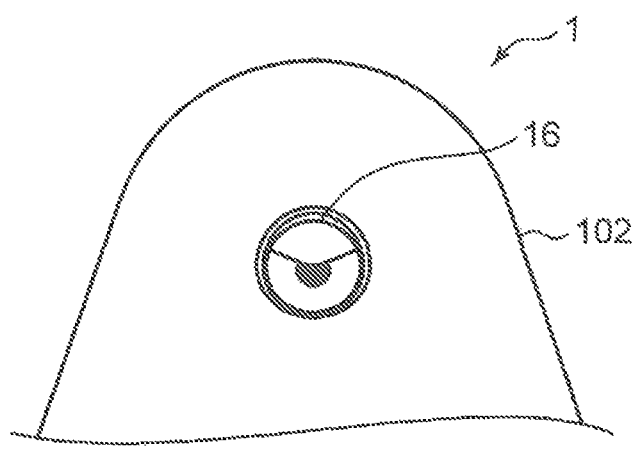
FIG. 16 is a view illustrating an example of art image displayed on the display when a fourth operation pattern is selected in the second embodiment.

FIG. 16 is a view illustrating an example of an image displayed on the display when the fourth operation pattern is selected in the second embodiment.

As illustrated in FIG. 16, when the fourth operation pattern is selected, the display 16 displays an image imitating an angry eye.

In addition, for example, a buzzer sound or an angry voice is associated with the fourth operation pattern.

Returning to FIG. 13, in Step S154, the communicator 19A of the third camera robot 3A receives the lifting information transmitted by the first camera robot 1A.

Note that the processing in Step S154 to Step S156 by the third camera robot 3A is the same as the processing in Step S134 to Step S136 by the second camera robot 2A.

As described above, since the lifted camera robot operates in the third operation pattern expressing refusal, and the other camera robot operates in the fourth operation pattern expressing anger, it is possible to urge a person who has lifted the camera robot to put down the camera robot.

Next, in Step S116, the controller 13A of the first camera robot 1A determines whether or not a predetermined time has elapsed since the first camera robot 1A has been lifted.

Here, when the determination is made that the predetermined time has elapsed since the first camera robot 1A has been lifted (YES in Step S116), the processing proceeds to Step S121.

On the other hand, when the determination is made that the predetermined time has not yet elapsed since the first camera robot 1A has been lifted (NO in Step S116), the controller 13A determines in Step S117 whether or not the first camera robot 1A has been put down. In a case where the lifting sensor 20 detects the first camera robot 1A being put down, the controller 13A determines that the first camera robot 1A has been put down.

Here, when the determination is made that the first camera robot 1A is not put down (NO in Step S117), the processing returns to Step S116.

On the other hand, when the determination is made that the first camera robot 1A has been put down (YES in Step S117), the controller 13A selects an operation pattern before the first camera robot 1A is lifted in Step S118. The controller 13A reads, from the memory 14, the operation pattern before the first camera robot 1A is lifted.

Next, in Step S119, the communicator 19A transmits the placement information indicating that the first camera robot 1A is put down, to the second camera robot 2 and the third camera robot 3. The placement information includes information specifying an operation pattern before the first camera robot 1A is lifted.

Next, in Step S120, the controller 13A starts the operation of the operation pattern before the first camera robot 1A is lifted. In a case where the operation pattern before the first camera robot 1A is lifted is the first operation pattern, the controller 13A starts the operation of the first operation pattern. When the operation pattern before the first camera robot 1A is lifted is the second operation pattern, the controller 13A starts the operation of the second operation pattern. Then, after the operation of the operation pattern before the first camera robot 1A is lifted is started, the processing returns to Step S110.

In Step S137, the communicator 19A of the second camera robot 2A receives the placement information transmitted by the first camera robot 1A.

Next, in Step S138, the controller 13A starts the operation of the operation pattern before the first camera robot 1A is lifted. The operation pattern before the first camera robot 1A is lifted is included in the placement information. Note that before starting the operation of the fourth operation pattern, the controller 13A of the second camera robot 2A may store, in the memory 14, the operation pattern before the first camera robot 1A is lifted.

In Step S157, the communicator 19A of the third camera robot 3A receives the placement information transmitted by the first camera robot 1A.

Note that processing in Step S157 to Step S158 by the third camera robot 3A is the same as the processing in Step S137 to Step S138 by the second camera robot 2A.

When the determination is made in Step S110 that one or more subjects have not been detected from the captured image (NO in Step S110), or when the determination is made in Step S116 that a predetermined time has elapsed since the first camera robot 1A has been lifted (YES in Step S116), the communicator 19A transmits, to the second camera robot 2A and the third camera robot 3A, the operation end instruction information for ending the operations of the second camera robot 2A and the third camera robot 3A according to the operation pattern in Step S121.

Note that the processing in Step S121 to Step S123 is the same as the processing in Step S11 to Step S13 in FIG. 7.

Further, processing in Step S139 to Step S141 is the same as the processing in Step S24 to Step S26 in FIG. 7. Further, processing in Step S159 to Step S161 is foe same as the processing in Step S34 to Step S36 in FIG. 7.

As described above, in a case where the first camera robot 1A is detected having been lifted, the third operation pattern of reacting to the lifting is selected, and the first camera robot 1A operates according to the third operation pattern. Therefore, for example, the first camera robot 1A operating in the third operation pattern expressing refusal makes it possible to urge a person who has lifted the first camera robot 1A to put down the robot. In addition, the one or more subjects can intentionally lift the first camera robot 1A to enjoy the operation of the first camera robot 1A according to the third operation pattern that is different from the first operation pattern and the second operation pattern.

Third Embodiment

Next, an imaging system according to a third embodiment of the present disclosure will be described.

In the third embodiment, in addition to the first operation pattern and the second operation pattern of the first embodiment, a fifth operation pattern is selected which represents a situation in which a plurality of camera robots output sound from a speaker in accordance with a rhythm of music.

Figure 17:
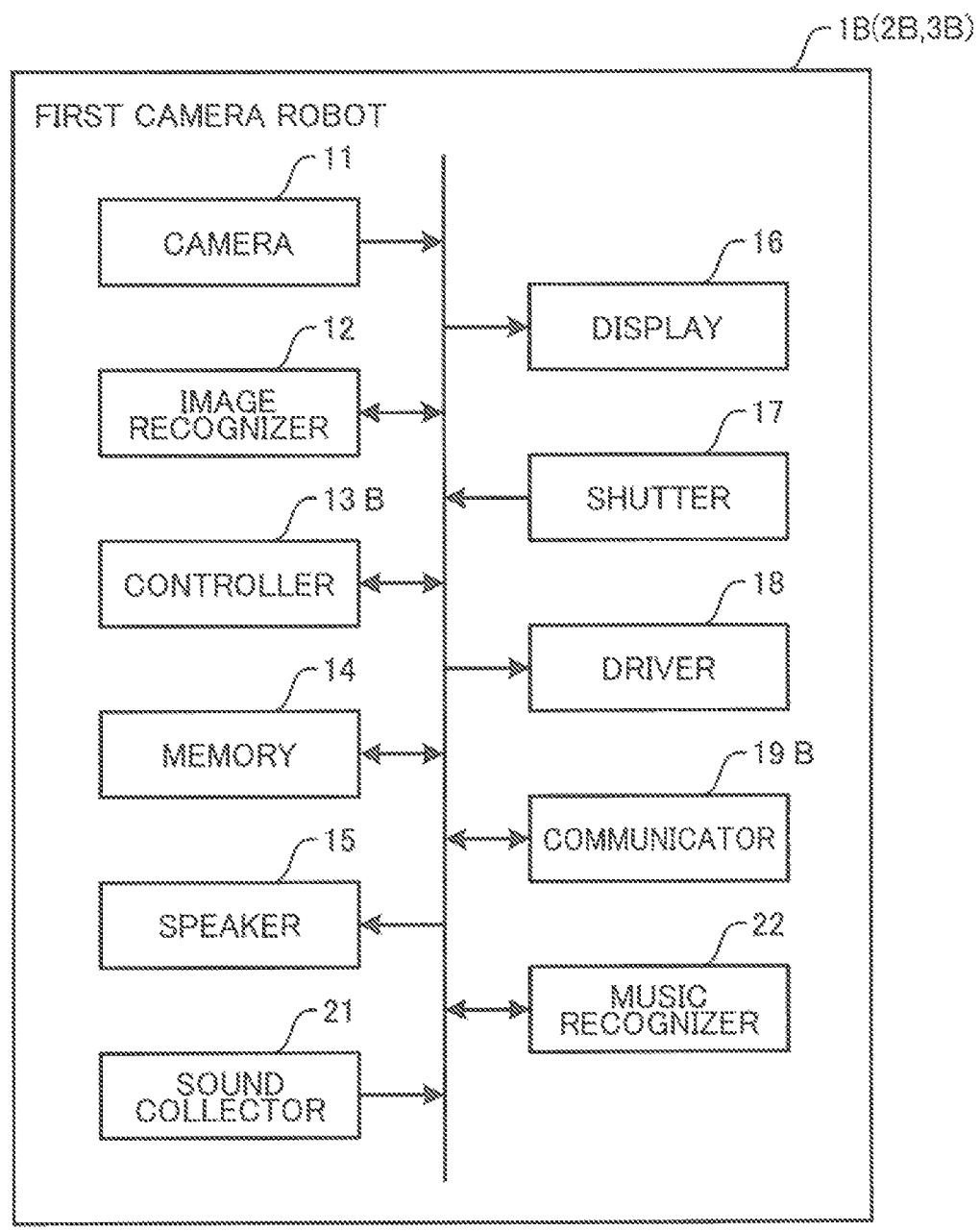
FIG. 17 is a block diagram illustrating a configuration of a first camera robot according to a third embodiment of the present disclosure.

FIG. 17 is a block diagram illustrating a configuration of a first camera robot according to the third embodiment of the present disclosure. The imaging system according to the third embodiment includes a first camera robot 1B, a second camera robot 2B, a third camera robot 3B, and a server 4. Since configurations of the second camera robot 2B and the third camera robot 3B are the same as the configuration of the first camera robot 1B, only the configuration of the first camera robot 1B will be described. In the third embodiment, the same components as those in the first embodiment are denoted by the same reference numerals, and the description thereof will be omitted.

The first camera robot 1B illustrated in FIG. 17 includes a camera 11, an image recognizer 12, a controller 13B, a memory 14, a speaker 15, a display 16, a shutter 17, a driver 18, a communicator 19B, a sound collector 21, and a music recognizer 22.

The sound collector 21 is, for example, a microphone, and collects surrounding sound.

The music recognizer 22 recognizes the sound collected by the sound collector 21 as music. Note that a technique for recognizing collected sound as music is a known technique. For example, there is a technique for specifying a title of music from collected sounds. In a case where a title of music is specified from collected sound, the music recognizer 22 may recognize the collected sound as music.

The controller 13B selects the fifth operation pattern of outputting sound from the speaker 15 in accordance with a rhythm of the music recognized by the music recognizer 22.

The communicator 19B transmits, to the other camera robots (the second camera robot 2B and the third camera robot 3B), music start instruction information for causing the other camera robots (the second camera robot 2B and the third camera robot 3B) to operate according to the fifth operation pattern selected by the controller 13B.

In addition, the communicator 19B receives, from the other camera robot (the second camera robot 2B or the third camera robot 3B), music start instruction information for causing the first camera robot 1B to operate according to the fifth operation pattern selected by the other camera robot (the second camera robot 2B or the third camera robot 3B).

The controller 13B causes the first camera robot 1B to operate according to the fifth operation pattern included in the music start instruction information received by the communicator 19B.

In addition, the communicator 19B transmits music end instruction information indicating that the first camera robot 1B ends recognition of the music to the other camera robots (the second camera robot 2B and the third camera robot 3B). The music end instruction information includes an operation pattern operating before the first camera robot 1B recognizes music.

The communicator 19B also receives the music end instruction information from the other camera robots (the second camera robot 2B and the third camera robot 3B). In a case where the music end instruction information from the other camera robots (the second camera robot 2B and the third camera robot 3B) is received, the controller 13B selects an operation pattern operating before the other camera robots (the second camera robot 2B and the third camera robot 3B) recognize music. At this time, the music end instruction information includes the operation pattern operating before the other camera robots (the second camera robot 2B and the third camera robot 3B) recognize the music.

Next, operation of the imaging system in the third embodiment of the present disclosure will be described.

Figure 18:
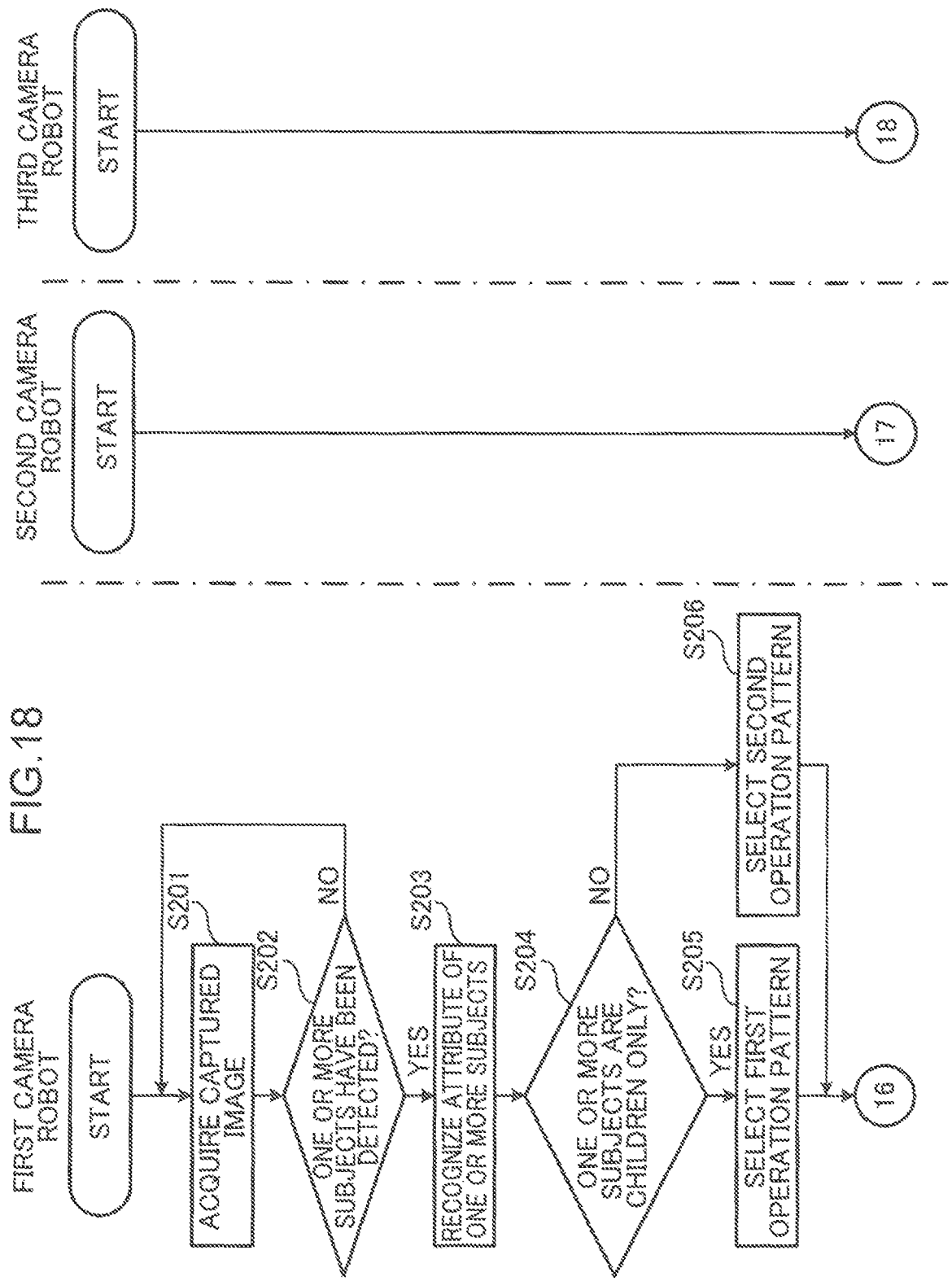
FIG. 18 is a first flowchart for explaining operation of an imaging system according to the third embodiment of the present disclosure.
Figure 19:
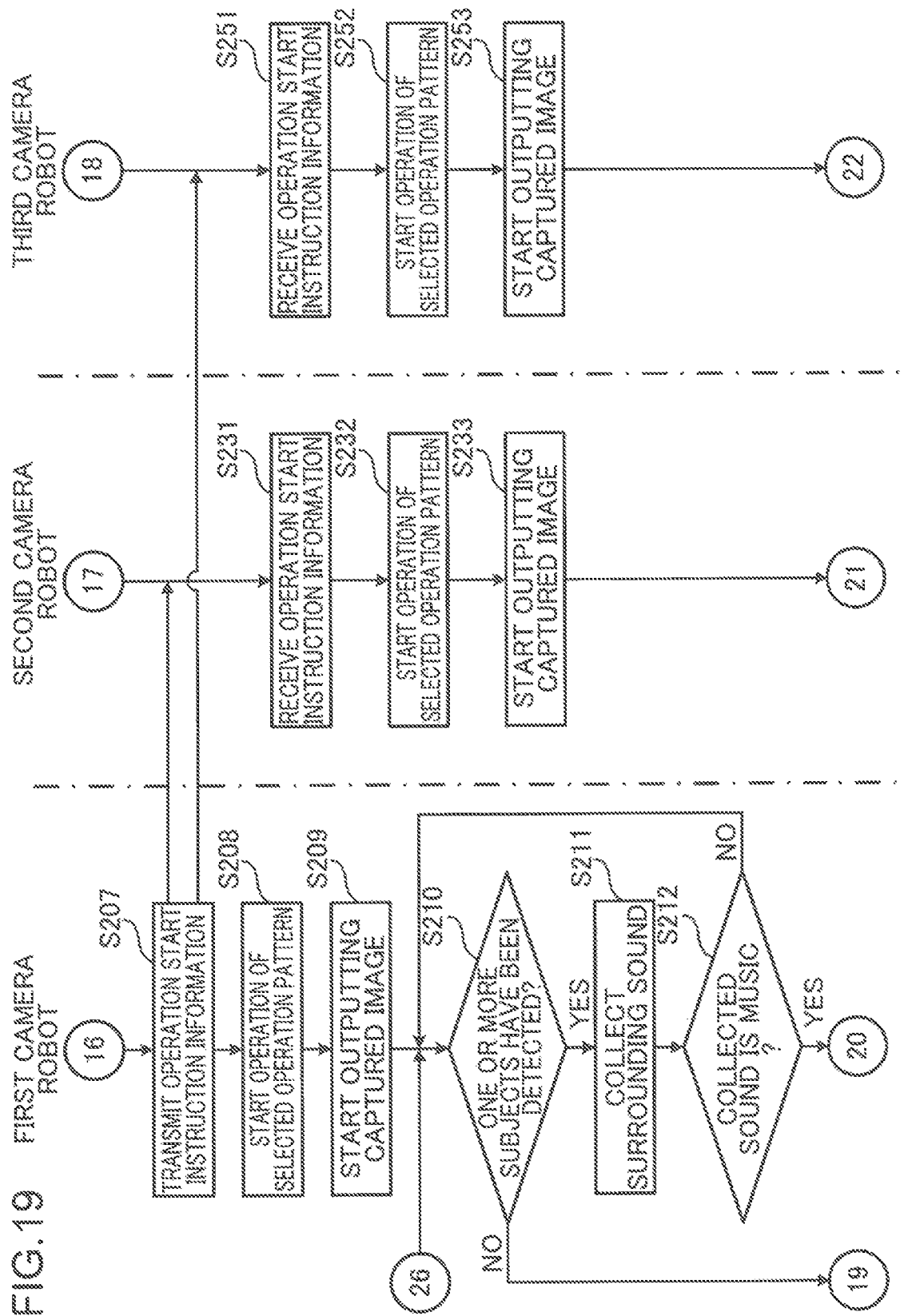
FIG. 19 is a second flowchart for explaining the operation of the imaging system according to the third embodiment of the present disclosure.

FIG. 18 is a first flowchart for explaining the operation of the imaging system according to the third embodiment of the present disclosure, FIG. 19 is a second flowchart for explaining the operation of the imaging system according to the third embodiment of the present disclosure, FIG. 20 is a third flowchart for explaining the operation of the imaging system according to the third embodiment of the present disclosure, and FIG. 21 is a fourth flow chart for explaining the operation of the imaging system according to the third embodiment of the present disclosure, in the description of FIG. 18 to FIG. 21, the first camera robot 1B is a main camera robot, and the second camera robot 2B and the third camera robot 3B are sub-camera robots.

Processing in Step S201 to Step S209 is the same as the processing in Step S1 to Step S9 in FIG. 6 and FIG. 7. Further, processing in Step S231 to Step S233 is the same as the processing in Step S21 to Step S23 in FIG. 7. Further, processing in Step S251 to Step S253 is the same as the processing in Step S31 to Step S33 in FIG. 7.

Next, in Step S210, the image recognizer 12 of the first camera robot 1B determines whether or not one or more subjects have been detected from the captured image. Here, when the determination is made that one or more subjects are not detected from the captured image (NO in Step S210), the processing proceeds to Step S221.

On the other hand, when the determination is made that one or more subjects have been detected from the captured image (YES in Step S210), the sound collector 21 collects surrounding sound in Step S211.

Next, in Step S212, the controller 13B determines whether the sound collected by the sound collector 21 is music or not. In a case where the sound collected by the music recognizer 22 is recognized as music, the controller 13B determines that the collected sound is music. The music includes a song and a tune played by a musical instrument. In addition, music is sung by one or more subjects or output from a television, a radio, a smartphone, or the like.

Here, when the determination is made that the collected sound is not music (NO in Step S212), the processing returns to Step S210.

On the other hand, when the determination is made that the collected sound is music (YES in Step S212), in Step S213, the controller 13B stores, in the memory 14, a current operation pattern, i.e., an operation pattern before the music is recognized.

Next, in Step S214, the controller 13B selects the fifth operation pattern. The fifth operation pattern is an operation pattern of outputting sound from the speaker 15 in accordance with a rhythm of the recognized music. For example, the controller 13B outputs sound of a musical instrument such as a drum or a whistle from the speaker 15 in synchronization with the rhythm of music.

Next, in Step S215, the communicator 19B transmits, to the second camera robot 2 and the third camera robot 3, the music start instruction information for causing the second camera robot 2 and the third camera robot 3 to operate according to the fifth operation pattern selected by the controller 13B.

Next, in Step S216, the controller 13B starts the operation of the selected fifth operation pattern. The controller 13B outputs a control signal corresponding to a drive pattern synchronized with a rhythm of music to the driver 18, outputs an image associated with the fifth operation pattern to the display 16, and outputs sound associated with the fifth operation pattern to the speaker 15 in synchronization with the rhythm of music.

The fifth operation pattern is associated with, for example, a drive pattern of repeating operation of rotating the upper casing 102 at a predetermined angle in one direction and at a predetermined angle in the otter direction in synchronization with a rhythm of music. In addition, for example, the image imitating a smiling eye illustrated in FIG. 8 is associated with the fifth operation pattern. In addition, for example, sound of a musical instrument such as a drum or a whistle is associated with the fifth operation pattern.

In Step S234, the communicator 19B of the second camera robot 2B receives the music start instruction information transmitted by the first camera robot 1B.

Next, in Step S235, the controller 13B selects the fifth operation pattern. The fifth operation pattern in the second camera robot 2B is the same as the fifth operation pattern in the first camera robot 1B.

Next, in Step S236, the controller 13B starts the operation of the fifth operation pattern. The controller 13B outputs a control signal corresponding to a drive pattern associated with the fifth operation pattern to the driver 18, outputs an image associated with the fifth operation pattern to the display 16, and outputs sound associated with the fifth operation pattern to the speaker 15 in synchronization with a rhythm of music.

In Step S254, the communicator 19B of the third camera robot 3B receives the music start instruction information transmitted by the first camera robot 1B.

Note that the processing in Step S254 to Step S256 by the third camera robot 3B is the same as the processing in Step S234 to Step S236 by the second camera robot 2B.

As described above, since the plurality of camera robots output sound in accordance with music being played in the surroundings, it is possible to make the surroundings have a pleasant atmosphere and bring out a good facial expression from one or more subjects.

Next, in Step S217, the controller 13B of the first camera robot 1B determines whether or not music has ended. In a case where sound collected by the music recognizer 22 is recognized as non-music, the controller 13B determines that the music has ended. Here, when the determination is made that the music has not ended (NO in Step S217), the determination processing in Step S217 is repeated.

On the other hand, when the determination is made that the music has ended (YES in Step S217), in Step S218, the controller 13B selects an operation pattern before the music is recognized. The controller 13B reads the operation pattern before the music is recognized from the memory 14.

Next, in Step S219, the communicator 19B transmits, to the second camera robot 2B and the third camera robot 3B, music end instruction information for causing the second camera robot 2B and the third camera robot 3B to end the operations according to the fifth operation pattern. Note that the music end instruction information includes information specifying an operation pattern before music is recognized.

Next, in Step S220, the controller 13B starts operation of the operation pattern before the music is recognized, in a case where the operation pattern before the music is recognized is the first operation pattern, the controller 13B starts the operation of the first operation pattern. In a case where the operation pattern before the music is recognized is the second operation pattern, the controller 13B starts the operation of the second operation pattern. Then, after the operation of the operation pattern before the music is recognized is started, the processing returns to Step S210.

In Step S237, the communicator 19B of the second camera robot 2B receives the music end instruction information transmitted by the first camera robot 1B.

Next, in Step S238, the controller 13B starts the operation of the operation pattern before the music is recognized. The operation pattern before the music is recognized is included in the music end instruction information. Note that the controller 13B of the second camera robot 2B may store, in the memory 14, the operation patient before the music is recognized before starling the operation of the fifth operation pattern.

In Step S257, the communicator 19B of the third camera robot 3B receives the music end instruction information transmitted by the first camera robot 1B.

Note that the processing in Step S257 to Step S258 by the third camera robot 3B is the same as the processing in Step S237 to Step S238 by the second camera robot 2B.

When the determination is made in Step S210 that one or more subjects have not been detected from the captured image (NO in Step S210), the communicator 19B transmits, to the second camera robot 2A and the third camera robot 3A, the operation end instruction information for causing the second camera robot 2A and the third camera robot 3A to end the operations in accordance with the operation patient in Step S221.

Note that the processing in Step S221 to Step S223 is the same as the processing in Step S11 to Step S13 in FIG. 7. Further, processing in Step S239 to Step S241 is the same as the processing in Step S24 to Step S26 in FIG. 7. Further, processing in Step S259 to Step S261 is the same as the processing in Step S34 to Step S36 in FIG. 7.

As described above, in a case where collected sound is recognized as music, since sound is output from the speaker 15 in accordance with a rhythm of the recognized music, a space with a pleasant atmosphere can be provided to one or more subjects, and a good facial expression can be brought out from one or more subjects.

Note that in the third embodiment, the music recognizer 22 may acquire a song sung by one or more subjects and specify a title of the acquired song. Then, the controller 13B may acquire music corresponding to the title of the song specified by the music recognizer 22 from the server 4 via the communicator 19B and output the acquired music from the speaker 15.

Furthermore, the server 4 may include the music recognizer 22. In this case, the communicator 19B may transmit the collected sound to the server 4 and receive a recognition result obtained by the server 4.

Further, in the first to third embodiments, bringing out a good facial expression from the subject of the camera 11 is equivalent to entertaining people around the robot. Therefore, the functions of the first to third embodiments are also applicable to a robot having no camera function.

In addition, the first camera robot, the second camera robot, and the third camera robot may execute operation corresponding to sound output together with video from a television or a tablet computer, in this case, the first camera robot, the second camera robot, and the third camera robot may further include a sound collector that acquires sound output together with video from a television or a tablet computer, and a sound recognizer that recognizes the sound acquired by the sound collector. The sound recognizer may recognize contents of a conversation of a person. The controller may cause the speaker 15 to output simple voice in the middle of the recognized conversation. For example, the controller may cause the speaker 15 to output a short word to be interposed between conversations as a voice.

Furthermore, the sound recognizer may recognize contents of a voice of a person. The controller may cause the speaker 15 to output voice expressing the same feeling as the feeling corresponding to the recognized voice. For example, in a case where a laughter in a comedy program or the like is recognized, the controller may cause the speaker 15 to output the laughter. The controller may also change an amount of movement in accordance with a volume or the number of sounds. For example, in a case where an explosive sound or a noisy sound is recognized, the controller may increase an operation amount according to a volume of sound. The controller may also change the amount of movement in accordance with music. For example, in a case where music is recognized, the controller may cause the robot to operate in accordance with a tempo of the music.

In this manner, the first camera robot, the second camera robot and the third camera robot operate in response to the video and voice output to the television or the tablet computer. As a result, it is possible to make user's video experience more enjoyable.

In addition, when a character is posted on a social networking service (SNS) site from a terminal, the first camera robot, the second camera robot, and the third camera robot may execute operation corresponding to the posted character. In this case, the first camera robot, the second camera robot, and the third camera robot may further include a communicator that receives, from the terminal or the SNS site, characters posted on the SNS site, and a character recognizer that recognizes the received characters. The controller may cause the speaker 15 to output voice corresponding to the recognized character. Note that the controller may cause the speaker 15 to output different voices according to the recognized characters.

In addition, in a case where a product is purchased at an electronic commerce (EC) site from a terminal, the first camera robot, the second camera robot, and the third camera robot may execute operation corresponding to the purchased product. In this case, the first camera robot, the second camera robot, and the third camera robot may further include a communicator that receives, from the terminal or the EC site, information on the product purchased on the EC site from the terminal. The controller may cause the speaker 15 to output voice corresponding to the received information regarding the product. Note that the controller may cause the speaker 15 to output different voices according to a price of the product.

In this manner, the first camera robot, the second camera robot, and the third camera robot operate in response to user's action on the Internet. As a result, the first camera robot, the second camera robot, and the third camera robot can connect the Internet world and the real world to make the user's life more enjoyable.

In addition, the first camera robot, the second camera robot, and the third camera robot may execute operation according to a change in smell, brightness, or air quality, in this case, the first camera robot, the second camera robot, and the third camera robot may further include a smell sensor, a brightness sensor, or a dust sensor. The smell sensor detects a surrounding smell component. The controller may cause the display 16 to display an image indicating a facial expression associated in advance with a detected smell component, and may cause the driver 18 to drive a part of the main body 100 according to a drive pattern associated in advance with the detected smell component. Note that the controller may execute different operations according to the smell component. For example, the controller may cause the display 16 to display an image indicating a pleasant facial expression for the smell of dinner. The dust sensor also detects an amount of surrounding dust. The controller may cause the display 16 to display an image indicating a facial expression associated in advance with an amount of a detected dust. The controller may perform different operations according to an amount of dust.

As a result, it is possible to make the user's life more enjoyable or to assist the user's life in response to a change in surrounding smell, brightness, or air quality.

In addition, the first camera robot, the second camera robot, and the third camera robot may execute operation according to a change in operation of a home appliance. In this case, the first camera robot, the second camera robot, and the third camera robot may further include a communicator that receives an operation completion signal indicating that predetermined operation is completed from the home appliance. When the operation completion signal is received, the controller may cause the speaker 15 to output a predetermined sound. For example, when an operation completion signal indicating that cooking is completed is received from a microwave oven, the controller may cause the speaker 15 to output voice notifying that cooking is completed. Furthermore, for example, in a case where an operation completion signal indicating that coffee dripping is completed is received from a coffee maker, the controller may cause the speaker 15 to output voice notifying that the coffee dripping is completed.

As described above, since the first camera robot, the second camera robot, and the third camera robot operate in cooperation with the home appliance, it is possible to make user's life using a home appliance more enjoyable.

Note that in each of the above embodiments, each component may be configured by dedicated hardware or may be implemented by executing a software program suitable for each component Each component may be implemented by reading and executing, by a program execution unit such as a CPU or a processor, of a software program recorded in a recording medium such as a hard disk or a semiconductor memory.

Some or all of the functions of the devices according to the embodiments of the present disclosure are realized as large scale integration (LSI) that is typically an integrated circuit. These may be individually integrated into one chip, or may be integrated into one chip so as to include a part or all of the functions. Further, the circuit integration is not limited to LSI, and may be realized by a dedicated circuit or a general-purpose processor. A field programmable gate array (FPGA) that can be programmed after manufacturing of LSI or a reconfigurable processor in which connections and settings of circuit cells inside LSI can be reconfigured may be used.

Some or all of the functions of the devices according to the embodiments of the present disclosure may be implemented by execution of a program by a processor such as a CPU.

In addition, the numbers used above are all illustrated to specifically describe the present disclosure, and the present disclosure is not limited to the illustrated numbers.

In addition, the order in which each step illustrated in the above flowchart is executed is for specifically describing the present disclosure, and may be an order other than the above order as long as a similar effect can be obtained. In addition, some of the above steps may be executed simultaneously (in parallel) with other steps.

INDUSTRIAL APPLICABILITY

Since the technique according to the present disclosure makes it possible to provide a space with a pleasant atmosphere to one or more subjects and to bring out a good facial expression from the one or more subjects, the technique is useful as a technique for capturing an image of one or more subjects while operating in cooperation with another robot.

The invention claimed is:

1. A robot that operates together with a second robot to capture an image of one or more subjects, the robot comprising:
    an imager that captures an image of surroundings;
    a detector that detects one or more subjects from within a captured image;
    a selector that selects an operation pattern of the robot based on an attribute of the one or more subjects detected;
    a transmitter that transmits, to the second robot, instruction information for causing the second robot to operate according to the selected operation pattern;
    an operator that causes the robot to operate according to the selected operation pattern;
    an outputter that outputs an image obtained by capturing the one or more subjects while the robot and the second robot are operating according to the selected operation pattern; and
    a sensor that detects the robot having been lifted,
    wherein, upon detection of the robot having been lifted, the selector selects a second operation pattern of reacting to the robot having been lifted, and
    the transmitter transmits lifting information indicating that the robot has been lifted to the second robot.

2. The robot according to claim 1, further comprising:
    a subject recognizer that recognizes whether the detected one or more subjects are children or adults,
    wherein the selector selects a first pattern as the operation pattern in a case where the detected one or more subjects are children only, and selects a second pattern as the operation pattern having a smaller operation amount of the robot than the first pattern in a case where the detected one or more subjects are not children only.

3. The robot according to claim 1, further comprising:
a receiver that receives second lifting information from the second robot, the second lifting information indicating that the second robot has been lifted,
wherein when the second lifting information is received from the second robot, the selector selects a third pattern of reacting to the second robot being lifted.

4. The robot according to claim 1, wherein
the sensor detects the robot, having been lifted, having been put down, and
upon detection of the robot having been put down, the selector selects a prior pattern that has been performed before the robot is lifted.

5. The robot according to claim 1, further comprising:
a sound collector that collects surrounding sound;
a music recognizer that recognizes the collected surrounding sound as music; and
a speaker;
wherein the selector selects a third operation pattern of outputting sound from the speaker in accordance with a rhythm of the recognized music.

6. The robot according to claim 1, further comprising:
a memory that stores installation location information indicating an installation location of the robot and personality information indicating a personality set in the robot in advance; and
a receiver that receives second installation location information and second personality information of the second robot from the second robot,
wherein in a case where the installation location of the robot is same as the second installation location of the second robot, the operator changes an operation amount of the selected operation pattern based on the personality information of the robot and the second personality information of the second robot.

7. The robot according to claim 1, further comprising:
a display disposed in a main body of the robot,
a speaker disposed in the main body, and
a driver that drives a part of the main body,
wherein the operator causes the display to display an image indicating a predetermined facial expression according to the selected pattern, causes the speaker to output a predetermined sound, and causes the driver to drive the part of the main body according to a predetermined drive pattern.

8. A control processing method in a robot, the robot operating together with a second robot to capture an image of one or more subjects, the control processing method comprising:
capturing an image of surroundings;
detecting one or more subjects from within a captured image;
selecting an operation pattern of the robot based on an attribute of the one or more subjects detected;
transmitting, to the second robot, instruction information for causing the second robot to operate according to the selected pattern;
causing the robot to operate according to the selected pattern;
outputting an image obtained by capturing the one or more subjects while the robot and the second robot are operating according to the selected pattern; and
detecting, by a sensor, that the robot has been lifted,
wherein, upon detection of the robot having been lifted, the control processing method selects a second pattern of reacting to the robot having been lifted, and
the control processing method transmits lifting information indicating that the robot has been lifted to the second robot.

9. A non-transitory computer readable recording medium storing a control processing program for causing a robot to operate together with a second robot to capture an image of one or more subjects, the control processing program causing a computer to function as:
an imager that captures an image of surroundings;
a detector that detects one or more subjects from within a captured image;
a selector that selects an operation pattern of the robot based on an attribute of the detected one or more subjects;
a transmitter that transmits, to the second robot, instruction information for causing the second robot to operate according to the selected operation pattern;
an operator that causes the robot to operate according to the selected operation pattern;
an outputter that outputs an image obtained by capturing the one or more subjects while the robot and the second robot are operating according to the selected pattern; and
a sensor that detects the robot having been lifted,
wherein, upon detection of the robot having been lifted, the computer selects a second operation pattern of reacting to the robot having been lifted, and
the computer transmits lifting information indicating that the robot has been lifted to the second robot.

* * * * *